(12) United States Patent
Kuru et al.

(10) Patent No.: US 11,933,031 B2
(45) Date of Patent: Mar. 19, 2024

(54) QUIET FLUSH ACTUATOR FOR PRESSURE-ASSIST TOILETS

(71) Applicant: Kohler Co., Kohler, WI (US)

(72) Inventors: William C. Kuru, Plymouth, WI (US); William Kalk, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 17/874,724

(22) Filed: Jul. 27, 2022

(65) Prior Publication Data

US 2022/0356688 A1  Nov. 10, 2022

Related U.S. Application Data

(63) Continuation of application No. 16/590,686, filed on Oct. 2, 2019, now Pat. No. 11,427,995.

(60) Provisional application No. 62/743,675, filed on Oct. 10, 2018.

(51) Int. Cl.
*E03D 3/02* (2006.01)
*F16K 31/524* (2006.01)

(52) U.S. Cl.
CPC .......... *E03D 3/02* (2013.01); *F16K 31/52408* (2013.01)

(58) Field of Classification Search
CPC ........ E03D 3/02; E03D 3/10; F16K 31/52408
See application file for complete search history.

(56) References Cited

U.S. PATENT DOCUMENTS

| 2,786,210 | A |   | 3/1957  | James |
|-----------|---|---|---------|-------|
| 3,291,439 | A |   | 12/1966 | Mira  |
| 3,720,962 | A |   | 3/1973  | Harrah |
| 4,233,698 | A |   | 11/1980 | Martin |
| 4,331,176 | A |   | 5/1982  | Parkison |
| 4,955,921 | A | * | 9/1990  | Basile ................. E03D 5/00 4/354 |
| 5,406,652 | A |   | 4/1995  | Hennessy |
| 5,742,950 | A | * | 4/1998  | Chang ................. E03D 1/18 4/359 |
| 5,970,527 | A |   | 10/1999 | Martin et al. |

(Continued)

FOREIGN PATENT DOCUMENTS

| CN | 1164880 A   | 11/1997 |
|----|-------------|---------|
| CN | 201050104 Y | 4/2008  |

(Continued)

OTHER PUBLICATIONS

Chinese Office Action for Chinese Application No. 201910957672.4 dated Aug. 31, 2020.

(Continued)

*Primary Examiner* — J C Jacyna
(74) *Attorney, Agent, or Firm* — Lempia Summerfield Katz LLC

(57) ABSTRACT

A tank assembly for a pressure-assist toilet includes a flush assembly having an outer chamber and an inner chamber disposed in the outer chamber. The flush assembly further includes a flush valve disposed in the inner chamber, and a pilot valve disposed in the inner chamber and extending through the flush valve. The tank assembly further includes an actuator engaging the pilot valve and configured to hold the pilot valve at each of a first height, a second height offset a first distance from the first height, and a third height offset a second distance from the first height greater than a first distance.

13 Claims, 18 Drawing Sheets

(56) References Cited

U.S. PATENT DOCUMENTS

| | | |
|---|---|---|
| 7,367,541 B2 | 5/2008 | Muderlak et al. |
| 7,617,545 B2 | 11/2009 | Martin |
| 8,151,378 B2 | 4/2012 | Dong |
| 9,507,352 B2 | 11/2016 | Dohi et al. |
| 2006/0282942 A1 | 12/2006 | Martin |
| 2010/0207044 A1 | 8/2010 | Dohi et al. |
| 2014/0173818 A1 | 6/2014 | Kosarnig |
| 2019/0040617 A1* | 2/2019 | Lappalainen ........... E03D 11/02 |

FOREIGN PATENT DOCUMENTS

| | | |
|---|---|---|
| CN | 201254751 Y | 6/2009 |
| CN | 101512202 A | 8/2009 |
| CN | 103122653 * | 5/2013 |
| CN | 103122653 A | 5/2013 |
| CN | 103140636 A | 6/2013 |
| CN | 104854282 A | 8/2015 |
| CN | 104975640 A | 10/2015 |
| CN | 207092208 U | 3/2018 |
| EP | 2177675 A1 | 4/2010 |
| JP | 2003321863 A | 11/2003 |

OTHER PUBLICATIONS

Chinese Office Action for Chinese Application No. 202011138330.9 dated Sep. 1, 2021.
India Examination Report for India Patent Application No. 201924040774 dated Nov. 10, 2020.

* cited by examiner

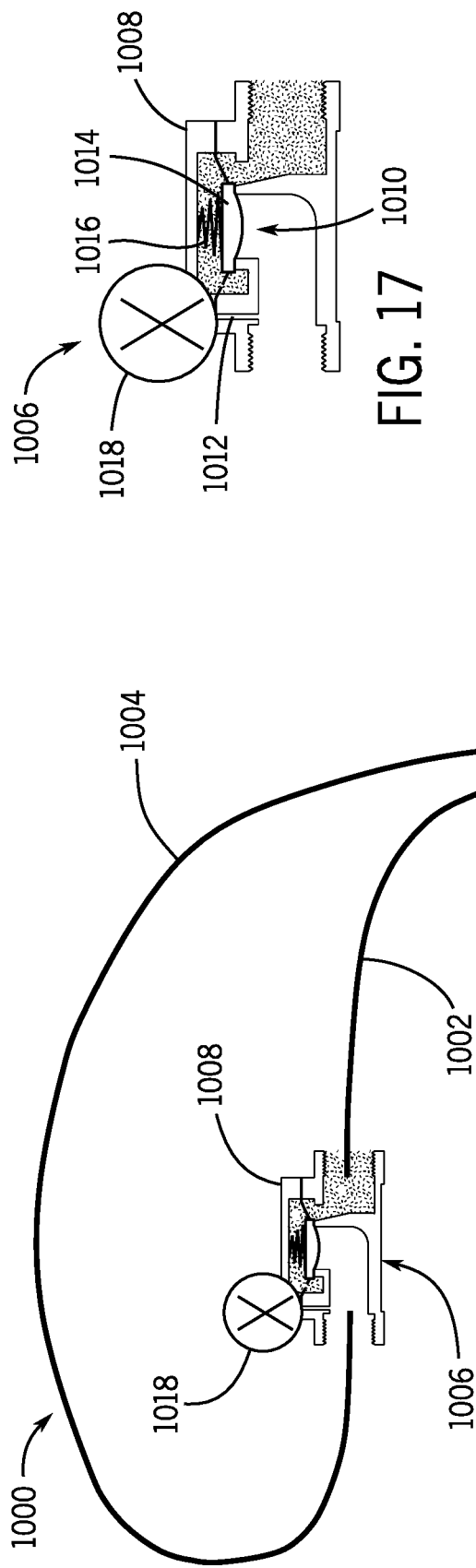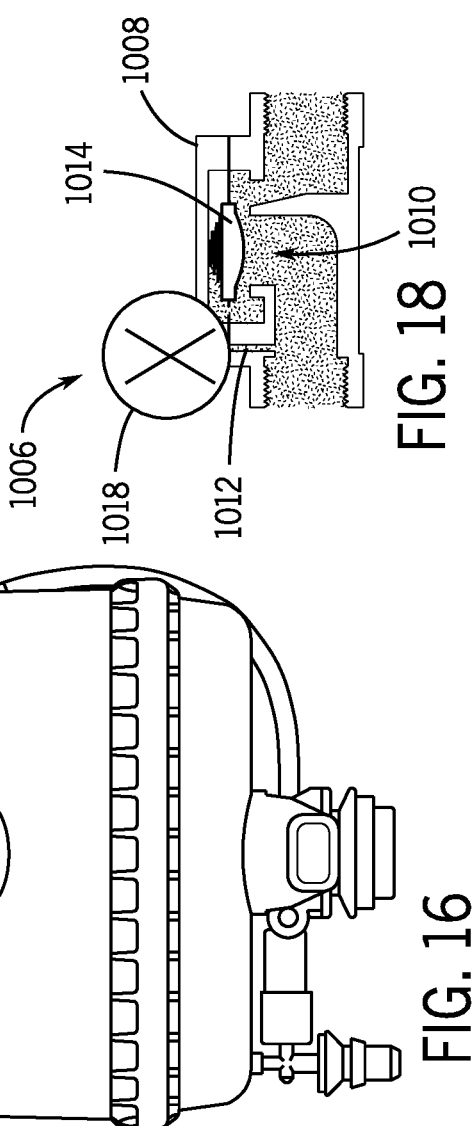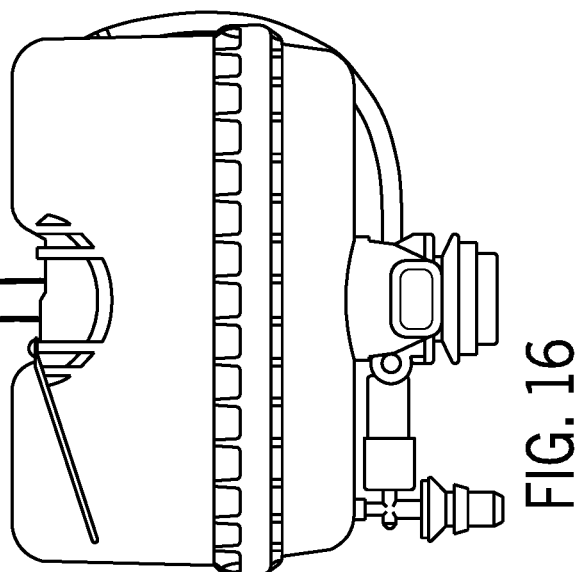
FIG. 16
FIG. 17
FIG. 18

United States Patent

QUIET FLUSH ACTUATOR FOR PRESSURE-ASSIST TOILETS

CROSS-REFERENCE TO RELATED PATENT APPLICATIONS

This application is a continuation under 35 U.S.C. § 120 and 37 C.F.R. § 1.53(b) of U.S. patent application Ser. No. 16/590,686 filed Oct. 2, 2019, which claims the benefit of and priority to U.S. Provisional Application No. 62/743,675, filed on Oct. 10, 2018, the entire disclosure of the aforementioned U.S. applications are hereby incorporated by reference herein.

BACKGROUND

The present application relates generally to the field of pressure-assist toilets, and more specifically to an actuator and corresponding method of flushing a pressure-assist toilet by relieving a portion of the pressure built up in a pressurized flush vessel.

Conventional pressure-assist toilets provide strong flushing and rinsing characteristics because water is introduced from a pressurized vessel into a bowl and trapway at a higher velocity than with a conventional gravity-fed toilet. However, this velocity of water results in a much louder flush sequence when compared to a gravity-fed toilet. To reduce the sound generated during the flush sequence, additional sound deadening material or a different vitreous composition may be used. However, these expensive and complicated modifications still do not significantly reduce the noise to levels of a comparable gravity-fed toilet. Further, these modifications may need to be provided at the time of manufacturing in the design of the toilet rather than installed at a later date by a user that would like to retrofit an existing a pressure-assist toilet to operate quieter.

It would therefore be advantageous to provide an actuator for a pressure-assist toilet that relieves a portion of the pressure built up in a pressurized flush vessel prior to full actuation of a flush valve to provide a much quieter flush sequence.

SUMMARY

One exemplary embodiment relates to a tank assembly for a pressure-assist toilet, including a flush assembly having an outer chamber and an inner chamber disposed in the outer chamber. The flush assembly further includes a flush valve disposed in the inner chamber, and a pilot valve disposed in the inner chamber and extending through the flush valve. The tank assembly further includes an actuator engaging the pilot valve and configured to hold the pilot valve at each of a first height, a second height offset a first distance from the first height, and a third height offset a second distance from the first height greater than a first distance.

Another exemplary embodiment relates to an actuator for a pressure-assist toilet, including a motor configured to be coupled to a flush assembly having a pilot valve for activating a flush sequence, and a cam coupled to the motor and configured to rotate about a cam axis. The cam defines an outer periphery including a first arc configured to move the pilot valve to a first height, a second arc configured to move the pilot valve to a second height below the first height, and a third arc configured to move the pilot valve to a third height below the first height and different than the second height.

Another exemplary embodiment relates to a flush assembly for a pressure-assist toilet. The flush assembly includes an outlet chamber, a flush valve cartridge, a first line, a second line, and a valve. The flush valve cartridge is coupled to the outer chamber and is configured to control a flow of water from the outer chamber. The second line is coupled to the flush valve cartridge. The valve is fluidly coupled to both the first line and the second line. The flush assembly is configured to selectively control the flow rate of fluid between the first line and the second line from a first flow rate at a beginning of a flush cycle to a second flow rate that is greater than the first flow rate.

BRIEF DESCRIPTION OF THE DRAWINGS

FIG. 16 is a front view of an air-actuated flush assembly, according to another exemplary embodiment.

FIG. 17 is a cross-sectional view of a mechanical flow control valve in a closed position, according to an exemplary embodiment.

FIG. 18 is a cross-sectional view of a mechanical flow control valve in an open position, according to an exemplary embodiment.

DETAILED DESCRIPTION

Referring to the FIGURES generally, a tank assembly for a pressure-assist toilet is shown according to various exemplary embodiments. In a pressure-assist toilet, the tank assembly includes a flush vessel, which is filled with water. The introduction of the water into the sealed flush vessel from a water supply causes pressure to build up in the flush vessel. When a full flush sequence is actuated, the water exits the flush vessel into the bowl and the trapway at a higher velocity than in a comparable gravity-fed non-pressurized tank assembly, more effectively evacuating waste and other contents from the bowl.

An exemplary embodiment of the present disclosure relates to a method of flushing a pressure-assist toilet, including providing a flush assembly having a pilot valve, and providing an actuator engaging the pilot valve. The method further includes moving the pilot valve with the actuator from a first position to a second position below the first position and holding the pilot valve in the second position. The method further includes moving the pilot valve with the actuator from the second position to a third position below the second position.

Figure 1:
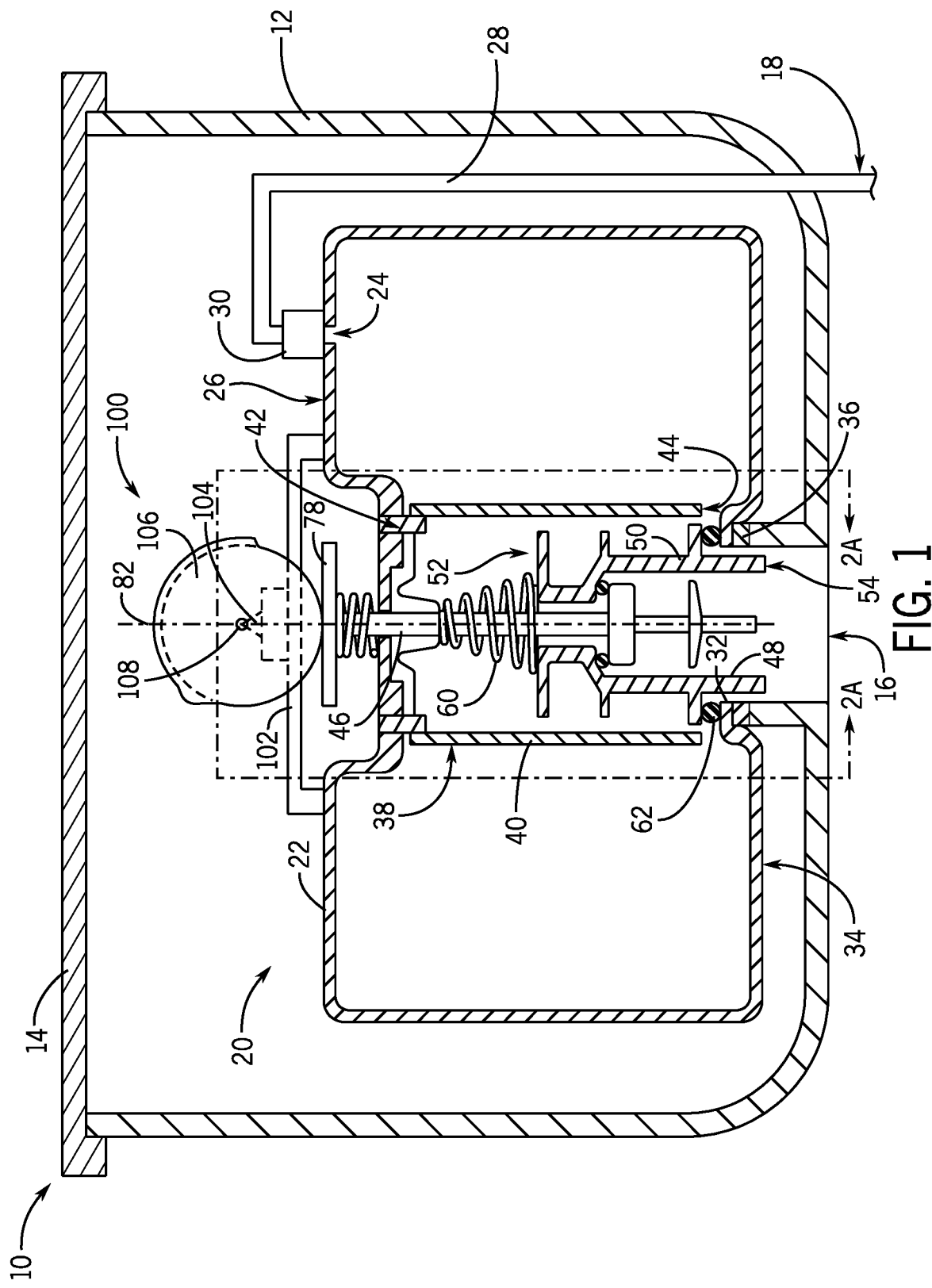
FIG. 1 is a cross-sectional view of a tank assembly with an actuator according to an exemplary embodiment.

Referring now to FIG. 1, a toilet tank assembly 10 is shown according to an exemplary embodiment before the actuation of a flush sequence in a pressure-assist toilet. The tank assembly 10 includes a vitreous tank 12 and a vitreous lid 14 disposed on the tank 12, although it should be understood that the tank 12 and the lid 14 may be formed from other suitable materials. The tank 12 includes a tank outlet 16 at a downstream end thereof, which is configured to be coupled to a corresponding flush inlet (not shown) in a pedestal to supply flush water to the pedestal during a flush sequence. The tank 12 further includes a tank inlet 18 extending through the tank 12. The tank inlet 18 may be fluidly connected to a water source (not shown) to provide fresh water to the tank assembly 10 for refilling after the flush sequence.

The tank 12 may be a conventional tank, which is configured for use as either a gravity-fed toilet, in which flush water is disposed directly in the tank 12, or as a pressure-assist toilet, in which water is disposed in an intervening flush assembly, which is disposed in the tank 12. According to another exemplary embodiment, the tank 12 may be specifically configured for use only with a pressure-assist flush assembly. While the FIGURES show a flush assembly disposed in the tank 12, it should be understood that the flush assembly may be installed on a toilet without a tank. For example, the flush assembly may be installed in a wall or other location (e.g., a toilet pedestal) and fluidly connected to a toilet bowl.

Referring still to FIG. 1, the tank assembly 10 further includes a flush assembly 20 disposed in the tank 12. The flush assembly 20 includes a pressurized outer chamber 22 (i.e., a first chamber, vessel, tank, compartment, housing, container, etc.), which is sealed and receives water from the water source. A chamber inlet 24 in an upper end 26 of the outer chamber 22 is coupled to the tank inlet 18 with a water supply line 28, which is then fluidly coupled to the water source for supplying water to the outer chamber 22. A pressure regulator 30 (i.e., a regulator valve) is disposed at the chamber inlet 24, between the outer chamber 22 and the water supply line 28, although it should be understood that the pressure regulator 30 may be disposed in other locations along the water supply line 28 upstream from the outer chamber 22.

The pressure regulator 30 operates as a one-way valve based on an outer chamber (i.e., a first) pressure $P_{OC}$, such that when the outer chamber pressure $P_{OC}$ falls below a predetermined threshold pressure $P_T$, the pressure regulator 30 opens and allows water to enter the outer chamber 22 from the water supply. The threshold pressure $P_T$ is less than line pressure from the water supply and may be approximately 30 psi. After a flush sequence is fully actuated and substantially all of the water in the outer chamber 22 or the flush assembly 20 is evacuated into the toilet, the outer chamber 22 is at approximately atmospheric pressure. The flush assembly 20 is then sealed from the toilet, such that when water is supplied to the outer chamber 22, the outer chamber pressure $P_{OC}$ begins to climb until it reaches the threshold pressure $P_T$ and the pressure regulator 30 closes. It should also be understood that the pressure regulator 30 restricts the flow rate (e.g., volume flow rate) of water from the water supply into the outer chamber 22. For example, the pressure regulator 30 provides water to the outer chamber 22 at a regulator volume flow rate $V_R$, as will be discussed in further detail below.

Referring still to FIG. 1, a chamber outlet 32 is formed in a lower end 34 of the outer chamber 22. The chamber outlet 32 is substantially aligned with the tank outlet 16. The chamber outlet 32 is coupled to and sealingly engages the tank outlet 16 to ensure that substantially all of the water output from the flush assembly 20 into the toilet passes through the tank outlet 16 and does not pass into the tank 12. For example, a gasket 36 (i.e., a first gasket) or other seal may be disposed between the chamber outlet 32 and the tank outlet 16 for generating a seal therebetween.

Figure 2A:
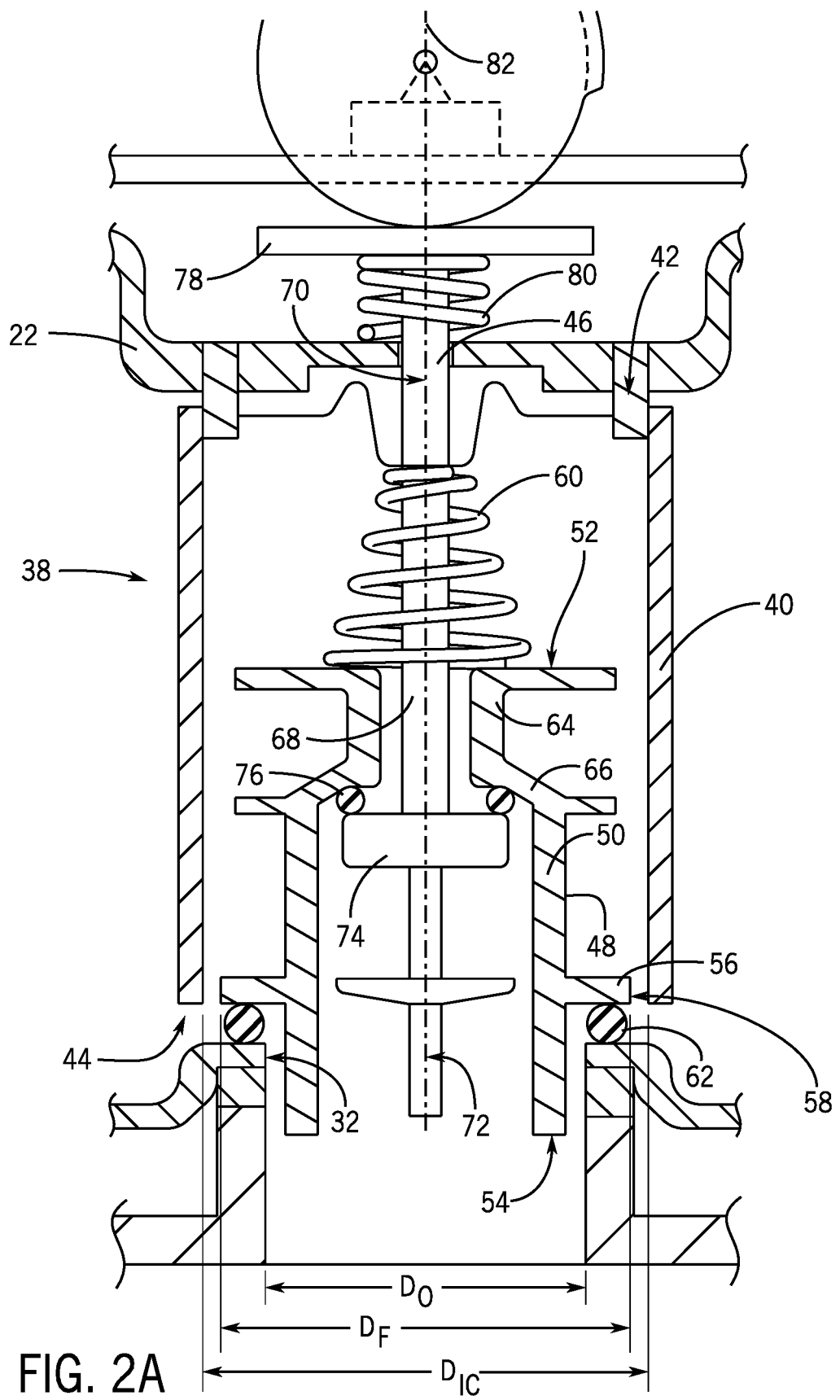
FIG. 2A is a close-up view of a pilot valve and a flush valve of the tank assembly of FIG. 1.

The flush assembly 20 further includes an inner chamber 38 (i.e., a second chamber, flush canister, valve chamber, etc.) disposed in the outer chamber 22. Referring now to FIG. 2A, a close-up view of the flush valve 48 in the flush assembly 20 is shown according to an exemplary embodiment. The inner chamber 38 includes an annular wall 40 defining an inner chamber diameter $D_{IC}$. The inner chamber 38 includes an upper end 42, which is coupled to and sealingly engages the upper end 26 of the outer chamber 22, and an opposing lower end 44, which extends generally downward toward the chamber outlet 32. The lower end 44 is generally open to the outer chamber 22, such that water passes from the outer chamber 22, below the annular wall 40 at the lower end 44 of the inner chamber 38 and into the inner chamber 38.

A pilot valve 46 (i.e., a first valve, an inner valve, etc.) and a flush valve 48 (i.e., a second valve, an outer valve, etc.) are disposed in the inner chamber 38, with the flush valve 48 disposed annularly about the pilot valve 46. The flush valve 48 includes a substantially annular flush valve body 50 having an upper end 52 and an opposing lower end 54.

As shown in FIG. 2A, a flange 56 (i.e., a flush valve flange, a first flange, a lip, etc.) extends radially outward from the flush valve body 50 at or proximate the lower end 54, such that the flange 56 defines a flange diameter $D_F$, which is greater than a chamber outlet diameter Do, and less than the inner chamber diameter $D_{IC}$. In this configuration, an outer periphery 58 of the flange 56 is spaced apart from the annular wall 40, such that water may pass therebetween from the outer chamber 22, passed the flange 56, and into the inner chamber 38. A flush valve (i.e., first) biasing member 60 (e.g., a spring) is disposed between the upper end 52 of the flush valve body 50 and the upper end 42 of the inner chamber 38 and is configured to bias the flush valve 48 toward the chamber outlet 32. For example, in between flushes (when the flush sequence is not fully actuated), the flange 56 is pressed into sealing engagement with the chamber outlet 32. As shown in FIG. 1, a flush valve gasket 62 (i.e., a second gasket, a seal, etc.) is disposed between the flange 56 and the chamber outlet 32, which forms a valve seat, although it should be understood that the flush valve 48 may sealingly engage other portions of the outer chamber 22 and/or the tank 12.

As shown in FIG. 2A, the flush valve body 50 further defines a neck 64 proximate the upper end 52 of the flush valve body 50 and a shoulder 66 having a larger internal diameter than that of the neck 64, extending directly downstream from and below the neck 64. The neck 64 is hollow, such that a portion of the pilot valve 46 extends therethrough. Specifically, the pilot valve 46 includes a stem 68 defining an upper end 70 and an opposing lower end 72 and a flange 74 (i.e., a pilot valve flange, a second flange, a lip, etc.) extending radially outward from the stem 68, in between the upper end 70 and the lower end 72, but proximate the lower end 72. The flange 74 is disposed downstream from and below the neck 64, and is configured to sealingly engage the shoulder 66, such that the shoulder 66 forms a valve seat. A pilot valve gasket 76 (i.e., a third gasket, a seal, etc.) is disposed between the flange 74 and the shoulder 66 of the flush valve 48, although it should be understood that the pilot valve 46 may sealingly engage the flush valve 48 in other ways.

The stem 68 extends upward from the neck 64, through the inner chamber 38 and through the upper end 42 of the inner chamber 38, such that the upper end 70 of the stem 68 is disposed outside of (i.e., external to) the outer chamber 22 and exposed to the interior of the tank 12 (see also FIG. 1). The stem 68 sealingly engages the upper end 42 of the inner chamber 38 to ensure that pressurized air and/or water in the inner chamber 38 does not leak out into the tank 12. A plunger 78 (i.e., a flange) extends radially outward from the stem 68, proximate the upper end 70. A pilot valve (i.e., second) biasing member 80 (e.g., a spring) is disposed between the upper end 70 of the stem 68 and the upper end 42 of the inner chamber 38, such that when the plunger 78 is pressed downward, the pilot valve biasing member 80 is compressed between the plunger 78 and the upper end 42 of the inner chamber 38. The pilot valve biasing member 80 is configured to bias the flange 74 into sealing engagement with the shoulder 66 of the flush valve 48.

A valve (e.g., vertical) axis 82 extends from the upper end 42 to the lower end 44 of the inner chamber 38. The flush valve 48 and wall 40 are formed annularly about the valve axis 82. The stem 68 of the pilot valve 46 extends along the valve axis 82, such that the flush valve 48 and the pilot valve 46 move along the direction of the valve axis 82 during various points in the flush sequence. Further, when the flush sequence is complete, as shown in FIG. 1, the flush valve 48 is forced downward by the flush valve biasing member 60 (e.g., springs) in the direction of the valve axis 82 to seal against the chamber outlet 32 and the pilot valve 46 is forced upward along the valve axis 82 to seal against the flush valve 48, thereby cooperating to seal the flush assembly 20. An inner chamber (i.e., a second) pressure $P_{IC}$ is provided in the inner chamber 38 and when the flush sequence is complete, the inner chamber pressure $P_{IC}$ equalizes with the outer chamber pressure $P_{OC}$ to provide a pressure equilibrium between the inner chamber 38 and the outer chamber 22 at approximately the threshold pressure $P_T$. In this configuration, when water enters the outer chamber 22 through the chamber inlet 24, the inner chamber pressure $P_{IC}$ increases at the same rate as the outer chamber pressure $P_{OC}$, thereby maintaining the equilibrium.

Referring again to FIG. 1, an actuator 100 (e.g., an actuator assembly) is shown according to an exemplary embodiment. The actuator 100 includes a mounting plate 102 (i.e., mounting bracket) coupled to the upper end 26 of the outer chamber 22. A motor 104 is disposed on the mounting plate 102 and a cam 106 is coupled to the motor 104 for rotation about a cam axis 108 (e.g., extending into the page), such that the cam 106 engages the upper end 70 of the stem 68 (e.g., at the plunger 78). According to other exemplary embodiments, the actuator 100 may be coupled to the outer chamber 22 or other portions of the tank 12, such that the cam 106 engages the upper end 70 of the stem 68. In the configuration shown in FIG. 1, the cam axis 108 extend substantially perpendicularly to the valve axis 82, although it should be understood that the cam axis 108 may have other orientations relative to the valve axis 82, as will be described in further detail below.

Figure 2B:
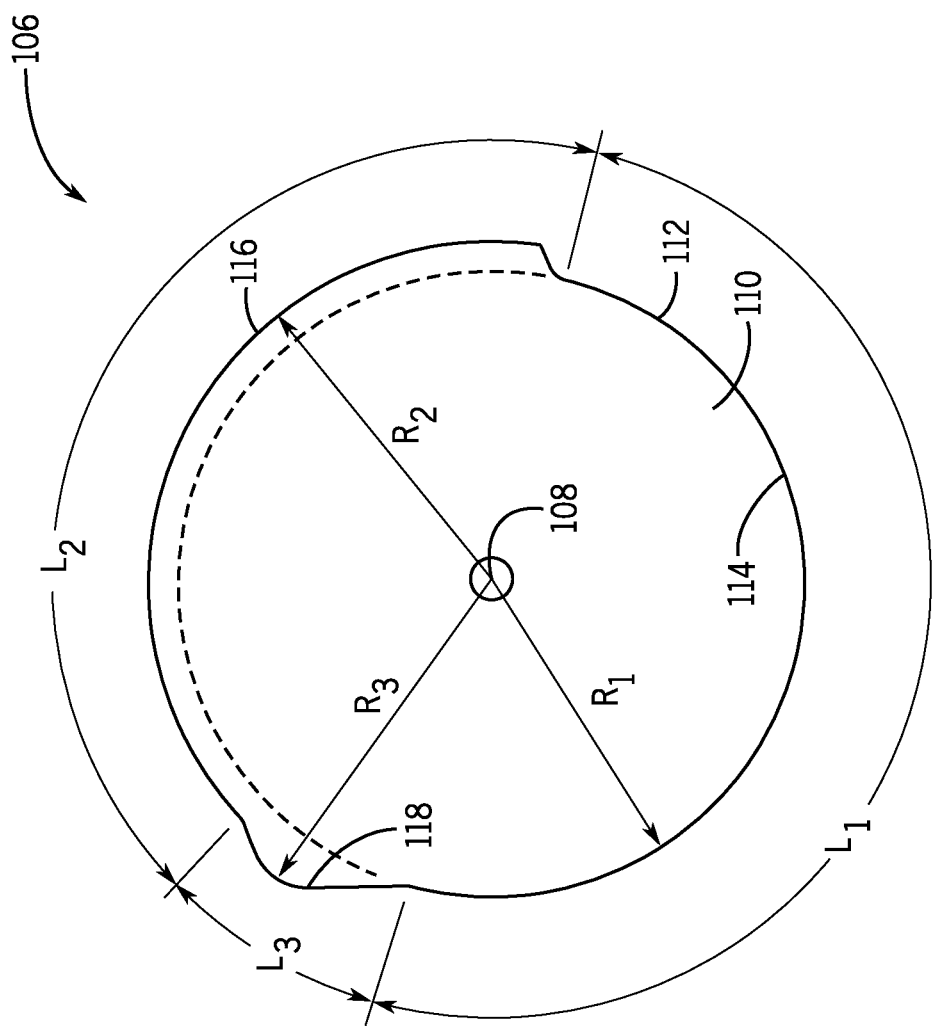
FIG. 2B is a close-up view of an actuator of the tank assembly FIG. 1.

Referring now to FIG. 2B, the cam 106 is shown in more detail, according to an exemplary embodiment. The cam 106 has a disc-shaped body 110 having an outer periphery 112 configured to engage the plunger 78 of the pilot valve 46 (see also FIG. 1). The outer periphery 112 of the cam 106 defines a first arc 114, a second arc 116, and a third arc 118 formed in a sequence along the outer periphery 112, with each arc 114, 116, 118 corresponding to different portions of a flush sequence. As shown in FIG. 2B, the cam 106 provides a non-constant radius, which varies at different points along the outer periphery 112. For example, the first arc 114 corresponds to a filling or resetting sequence when the first arc 114 engages the plunger 78 and has a first radius $R_1$ and a first arc length $L_1$. The second arc 116 corresponds to a pressure release sequence when the second arc 116 engages the plunger 78 and has a second radius $R_2$ greater than the first radius $R_1$ and has a second arc length $L_2$. The third arc 118 corresponds to an evacuation sequence when the third arc 118 engages the plunger 78, in which water is fully evacuated from the outer chamber 22, and has a third radius $R_3$ greater than each of the first radius $R_1$ and the second radius $R_2$ and has a third arc length $L_3$. To the extent that the radii $R_1$, $R_2$, $R_3$ vary along the length of each arc 114, 116, 118, the corresponding radius $R_1$, $R_2$, $R_3$ relates to the greatest radius along that arc 114, 116, 118.

The first, second, and third arc lengths $L_1$, $L_2$, $L_3$ may be different, corresponding to different lengths for each portion of the flush sequence. The motor 104 may be an electric motor, which completes one full rotation about the cam axis 108 during the entire flush sequence. In this configuration, the amount of time spent during each of the filling sequence, pressure release sequence, and the evacuation sequence is controlled based on the corresponding arc length $L_1$, $L_2$, $L_3$. For example, as shown in FIG. 2B, the first arc length $L_1$ is greater than the second arc length $L_2$, which is in turn greater than the third arc length $L_3$. In this configuration, the actuator 100 spends the most amount of time in the filling sequence, then less time in the pressure release sequence, then less time in the evacuation sequence. It should be understood that the evacuation sequence begins the siphon in the toilet and the siphon may continue to operate even after the evacuation sequence is complete and the actuator 100 has rotated to the position associated with the filling sequence ($L_1$). Notably, a siphon is not formed during the pressure release sequence, even as water is output from the flush assembly 20. As a result, the rotational position of the cam 106 controls the flow of water in the tank 12, but may not directly control the flush sequence in the rest of the toilet. According to another exemplary embodiment, the motor 104 may be a step motor, such that the rotational position of the cam 106 about the cam axis 108 is controlled by the position of the step motor 104 and the first, second, and third arcs 114, 116, 118 may have any arc length $L_1$, $L_2$, $L_3$.

Figure 3:
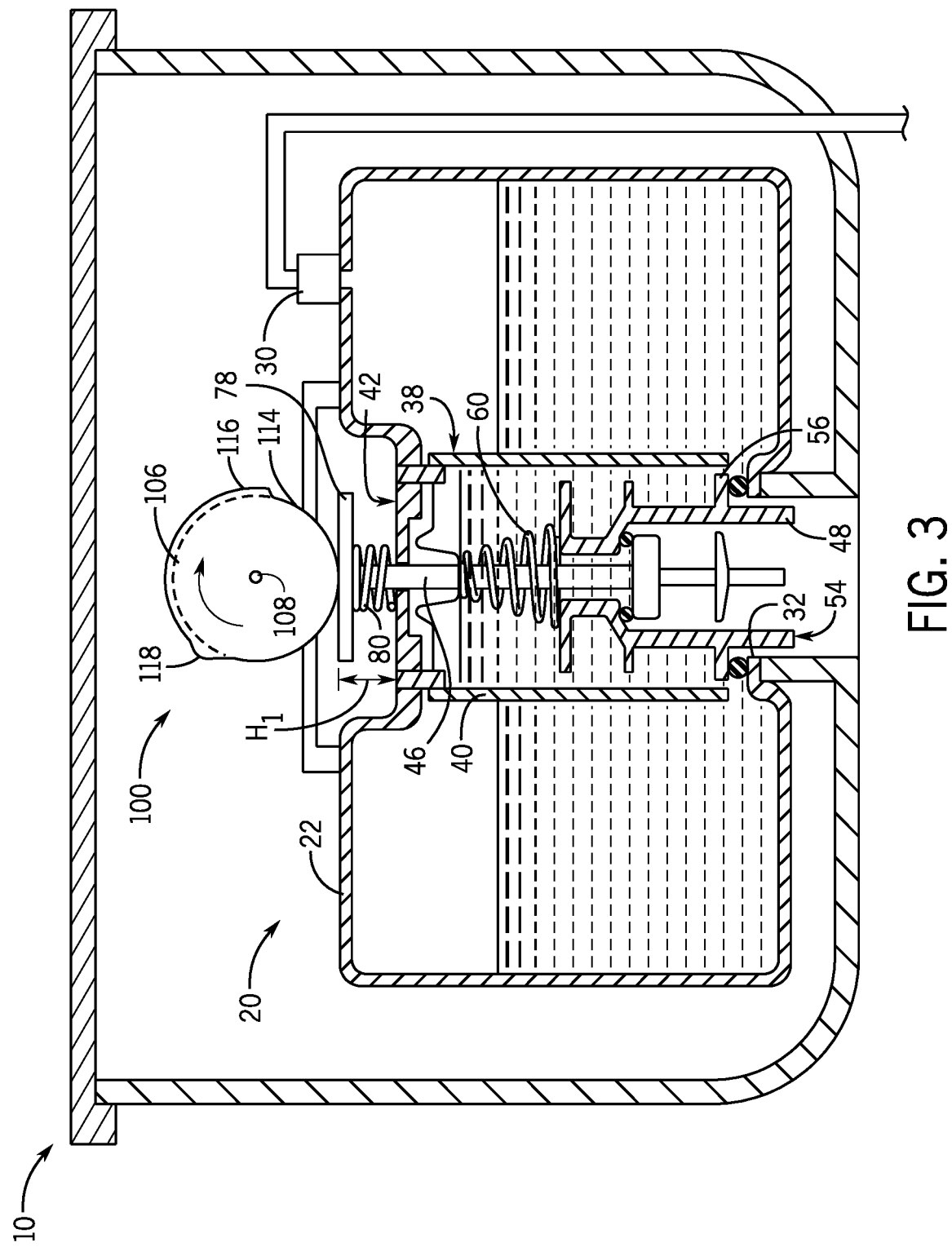
FIG. 3 shows the tank assembly of FIG. 1 containing a volume of water.

Referring now to FIG. 3, the tank assembly 10 of FIG. 1 is shown with the motor 104 and a portion of the mounting plate 102 removed for clarity to show the rotational position of the cam 106 during the filling sequence. It should be understood that the actuator 100 or any other actuator described in this application may be coupled to (e.g., installed on) the flush assembly 20 in the same or different ways. In this portion of the flush sequence, the pilot valve 46 is seated against the flush valve 48 and the flush valve 48 is seated against the chamber outlet 32. The pilot valve 46 (e.g., an upper surface of the plunger 78) is provided at a first height $H_1$ (i.e., first position) above the upper end 42 of the inner chamber 38. The cam 106 is rotated to an orientation about the cam axis 108, such that the first arc 114 of the cam 106 engages (e.g., is disposed on) the plunger 78. According to another exemplary embodiment, during the filling sequence, the first arc 114 may be disposed proximate but spaced apart from the plunger 78.

Figure 4:
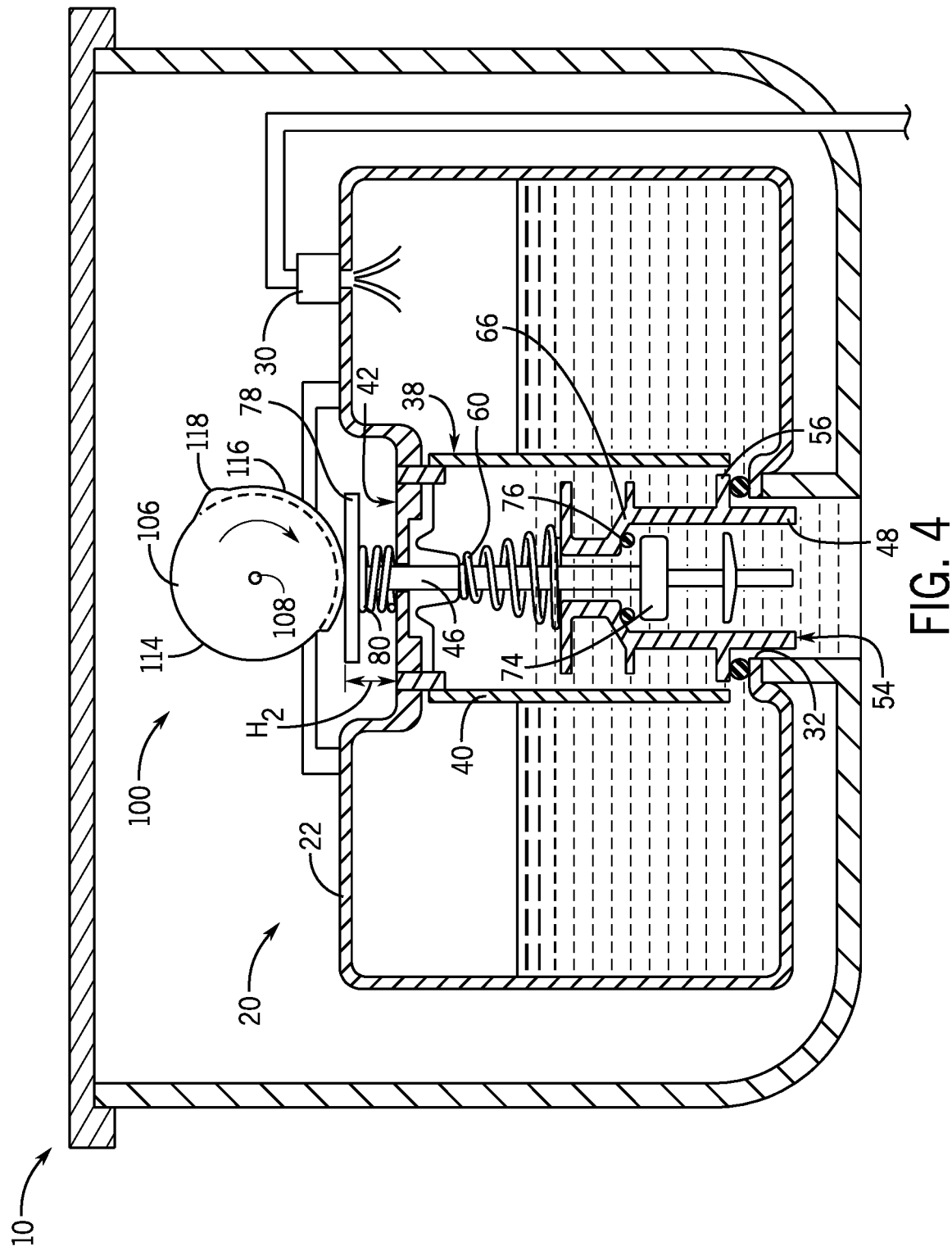
FIG. 4 shows the tank assembly of FIG. 1 in a first step of a flush sequence.

Referring now to FIG. 4, the tank assembly 10 is shown in the pressure release sequence. In this portion of the flush sequence, the cam 106 is rotated to an orientation about the cam axis 108, such that the second arc 116 of the cam 106 engages the plunger 78. The pilot valve 46 is pressed downward opposing the pilot valve biasing member 80, such that the pilot valve 46 is unseated from the flush valve 48. As the pilot valve 46 is unseated, the plunger 78 is disposed at a second height $H_2$ (i.e., second position) above the upper end 42, which is below (e.g., less than) the first height $H_1$. The difference between the first height $H_1$ and the second height $H_2$ is a pressure release (i.e., a first) distance $D_{PR}$ and is substantially the same distance that the flange 74 of the pilot valve 46 is offset from the shoulder 66 of the flush valve 48. The pressure release distance $D_{PR}$ is substantially the same as or less than the difference between the first radius $R_1$ and the second radius $R_2$ of the cam 106, such that the pressure release distance $D_{PR}$ correlates directly with the radius of the cam 106.

When the pilot valve 46 is depressed and held by the cam 106 to the second height $H_2$ during the pressure release sequence, water begins to pass from the inner chamber 38, between the flange 74 and the shoulder 66 of the flush valve 48 at a pilot valve volume flow rate $V_{PV}$, and out through the lower end 54 of the flush valve 48 and into the toilet. As water is released from the inner chamber 38, the inner chamber pressure $P_{IC}$ temporarily drops below the outer chamber pressure $P_{OC}$, which causes water to flow from the outer chamber 22, underneath the wall 40, into the inner chamber 38 at a chamber volume flow rate $V_C$, thereby lowering the water level in the outer chamber 22 and causing the outer chamber pressure $P_{OC}$ to drop. This slight drop in the outer chamber pressure $P_{OC}$ prior to lifting the flush valve 48 reduces the pressure differential between the outer chamber 22 and ambient pressure $P_A$.

The chamber volume flow rate $V_C$ is controlled by the cross-sectional area defined between the wall 40 and the flange 56, which may be less than the cross-sectional area of the opening between the flange 74 and the shoulder 66 of the flush valve 48, such that the chamber volume flow rate $V_C$ is less than the pilot valve volume flow rate $V_{PV}$. In this configuration, water is output from the inner chamber 38 faster than it refills, causing the inner chamber pressure $P_{IC}$ to drop faster than the outer chamber pressure $P_{IC}$ drops. According to other exemplary embodiments, the chamber volume flow rate $V_C$ may be substantially the same as or greater than the pilot valve volume flow rate $V_{PV}$.

When the outer chamber pressure $P_{OC}$ drops below the threshold pressure $P_T$, the pressure regulator 30 reopens and starts to introduce more water into the outer chamber 22. According to an exemplary embodiment, the pilot valve volume flow rate $V_{PV}$ and/or the chamber volume flow rate $V_C$ is greater than the regulator volume flow rate $V_R$, such that continuously holding the pilot valve 46 at the second height $H_2$ would cause the outer chamber 22 to slowly drain. According to other exemplary embodiments the pilot valve volume flow rate $V_{PV}$ and/or the chamber volume flow rate $V_C$ may be substantially the same as or less than the regulator volume flow rate $V_R$.

The downward force on the flange 74 is controlled by the pilot valve volume flow rate $V_{PV}$, which in turn is controlled by the pressure release distance $D_{PR}$. For example, as the pressure release distance $D_{PR}$ increases, the cross-sectional area of the opening between the flange 74 and the shoulder 66 increases, increasing the pilot valve volume flow rate $V_{PV}$. As the pilot valve volume flow rate $V_{PV}$ increases, more water engages the flange 74, thereby increasing the downward force on the flange 74. At the second height $H_2$ during the pressure release sequence, the upward biasing force of the pilot valve biasing member 80 is greater than the downward force generated by the flow of water around the flange 74. For example, if the plunger 78 were released by rotating the cam 106 directly to the filling sequence position without first passing through the evacuation sequence position, the plunger 78 would return back to the first height $H_1$ rather than causing the flush valve 48 to unseat.

As shown in FIG. 4, the flush valve 48 remains seated against the chamber outlet 32 when the pilot valve 46 is disposed at the second height $H_2$. An upward force is applied to the flush valve 48 due, at least in part, to the pressure differential between the outer chamber pressure $P_{OC}$, which is applied to the lower end 54 of the flush valve 48 proximate the flange 56, and the inner chamber pressure $P_{IC}$, which is applied to the upper end 52 of the flush valve 48. The pressure differential further causes water to flow upward along the flush valve 48, which contributes to the upward force on the flush valve 48 by contacting the flange 56 or other structures extending outward from the flush valve body 50. As the pressure differential increases due to the continuous drop of the inner chamber pressure $P_{IC}$, the upward force on the flush valve 48 increases. In the pressure release sequence, the upward force on the flush valve 48 is less than the opposing downward biasing force on the flush valve 48 from the flush valve biasing member 60. In this configuration, pressure is released from the outer chamber 22, through the pilot valve 46 without actuating the full evacuation of the outer chamber 22 by raising the flush valve 48.

Figure 5:
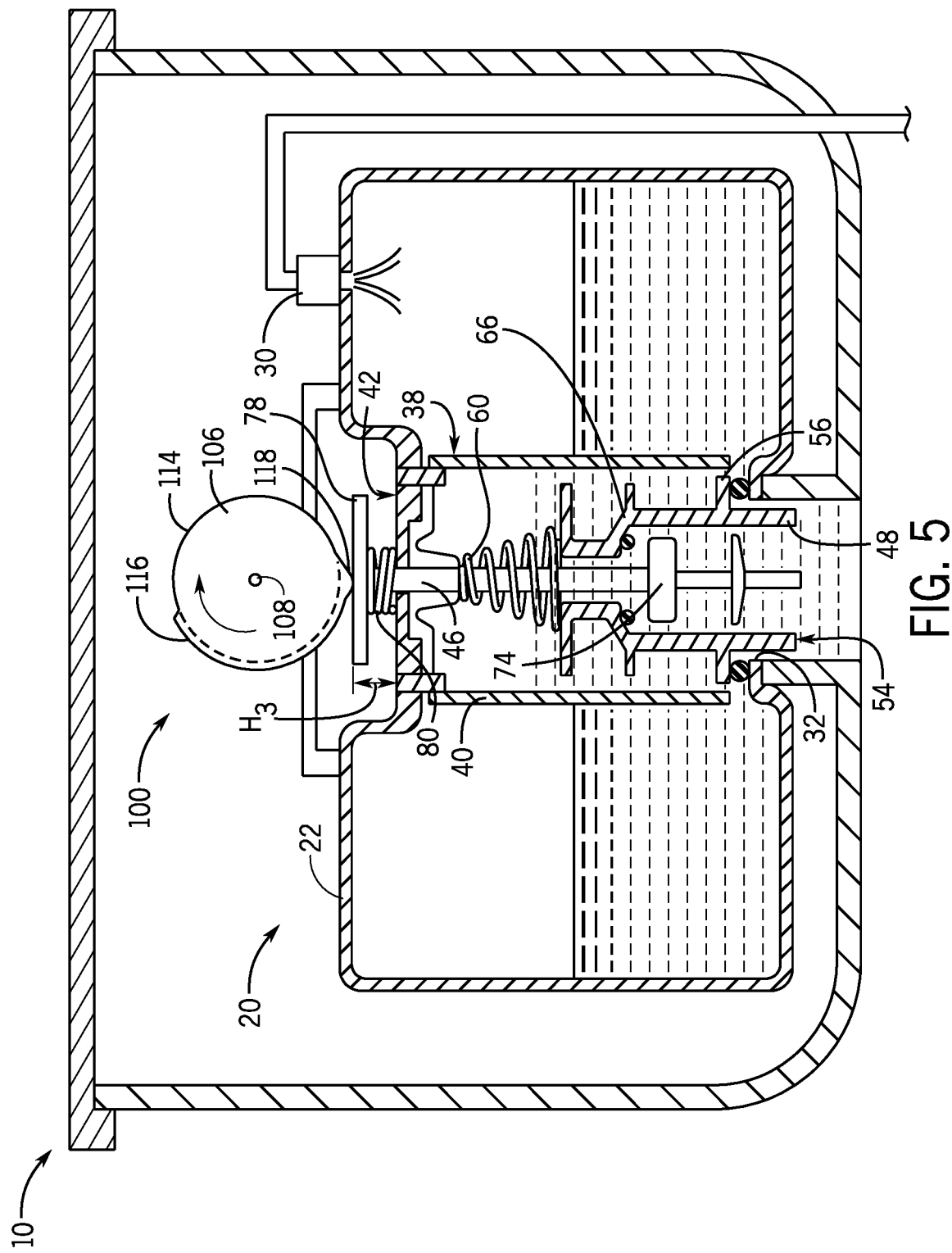
FIG. 5 shows the tank assembly of FIG. 1 in a second step of the flush sequence.

Referring now to FIG. 5, the tank assembly 10 is shown in the evacuation sequence. In this portion of the flush sequence, the cam 106 is rotated to an orientation about the cam axis 108, such that the third arc 118 of the cam 106 engages the plunger 78. The pilot valve 46 is pressed further downward, maintaining that the pilot valve 46 unseated from the flush valve 48. The plunger 78 is disposed at a third height $H_3$ (i.e., third position) above the upper end 42, which is below (e.g., less than) each of the first height $H_1$ and the second height $H_2$. The difference between the first height $H_1$ and the third height $H_3$ is an evacuation (i.e., a second) distance $D_E$ and is substantially the same as or less than the difference between the first radius $R_1$ and the third radius $R_3$ of the cam 106, such that the evacuation distance $D_E$ correlates directly with the radius of the cam 106. Similarly, the evacuation distance $D_E$ is substantially the same as the difference between the second radius $R_2$ and the third radius $R_3$ of the cam 106.

When the pilot valve 46 is pressed down by the evacuation distance $D_E$ to the third height $H_3$, the cross-sectional opening between the flange 74 and the shoulder 66 increases larger than the area shown in FIG. 4. As a result, the pilot valve volume flow rate $V_{PV}$ increases, thereby increasing the downward force on the pilot valve 46, such that the downward force is greater than the upward biasing force from the pilot valve biasing member 80 and holds the pilot valve 46 open. During this portion of the evacuation sequence, substantially all of the water in the inner chamber 38 is evacuated through the lower end 54 of the flush valve 48 and into the toilet, reducing the inner chamber pressure $P_{IC}$ to approximately the same as ambient pressure $P_A$.

According to an exemplary embodiment, the evacuation sequence may be initiated with a delay between approximately 3 and 5 seconds after the flush sequence is actuated. For example, this delay corresponds to the duration of time that the cam 106 takes to rotate from the orientation shown in FIG. 3, with the first arc 114 engaging the plunger 78, to the orientation shown in FIG. 5, with the third arc 118 engaging the plunger 78. According to other exemplary embodiments, the delay may be between approximately 1 and 3 seconds, 2 and 4 seconds, 1 and 5 seconds, or other durations.

Figure 6:
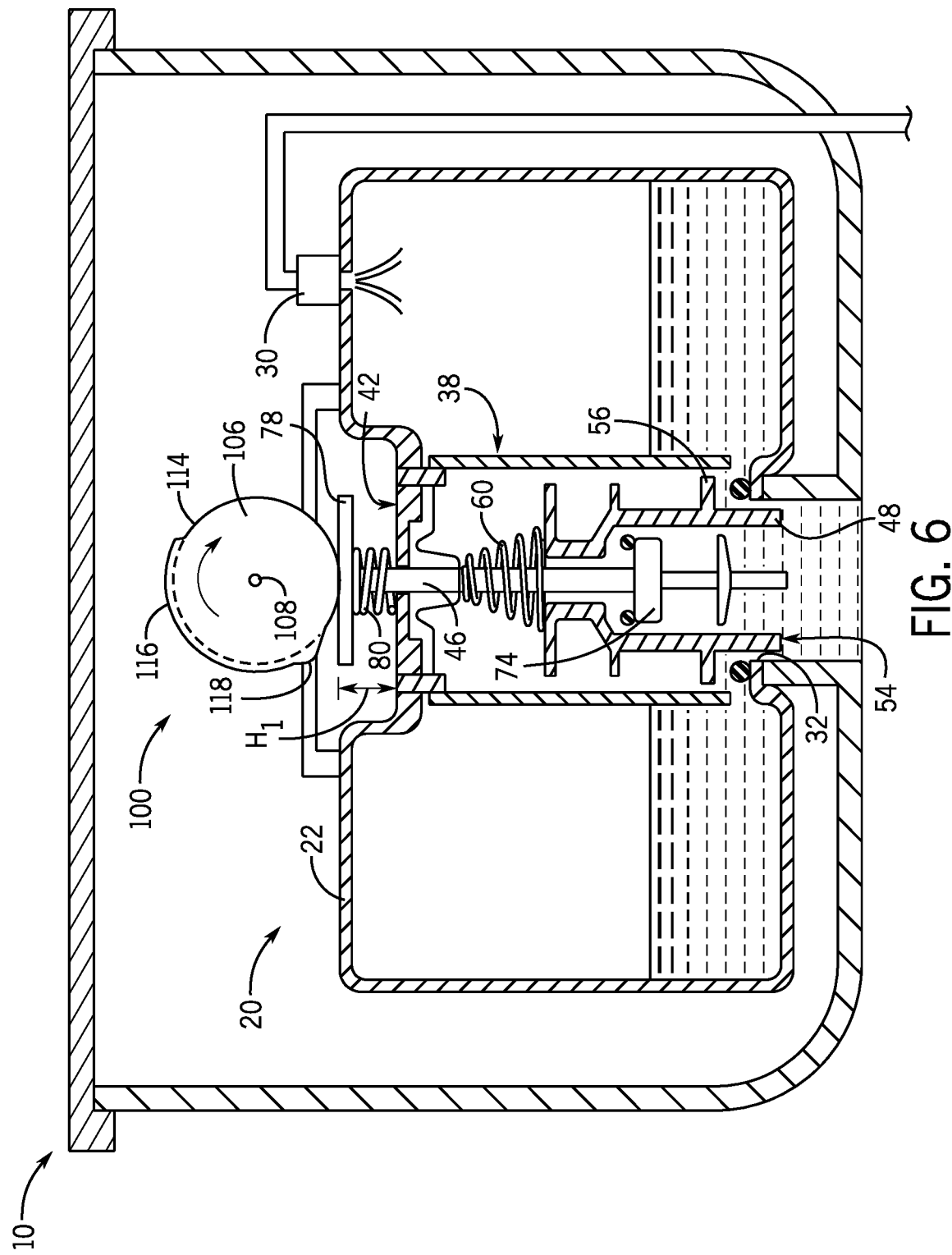
FIG. 6 shows the tank assembly of FIG. 1 in a third step of the flush sequence.

Referring now to FIG. 6, the tank assembly 10 is shown according to another aspect of the evacuation sequence. Specifically, the tank assembly 10 is shown with both the pilot valve 46 and the flush valve 48 unseated. According to an exemplary embodiment, the increased pilot valve volume flow rate $V_{PV}$ due to the positioning at the third height $H_3$, discussed above, also increases the pressure differential between the outer chamber pressure $P_{OC}$ and the inner chamber pressure $P_{IC}$, which increases the flow rate around the outer surfaces (e.g., the flange 56) of the flush valve 48. As a result, the upward force on the flush valve 48 increases, such that the upward force on the flush valve 48 is greater than the downward biasing force from the flush valve biasing member 60, allowing the flush valve 48 to open and holding it open while the outer chamber 22 is evacuated directly through the chamber outlet 32, rather than passing through the neck 64 of the flush valve 48.

After the flush valve 48 opens, less or no water flows past the flange 74 of the pilot valve 46, reducing the downward force on the pilot valve 46. The pilot valve 46 then returns to the first height $H_1$, shown in FIGS. 1 and 3, which may occur while the flush valve 48 remains open or after the flush valve 48 is once again seated against the chamber outlet 32. For example, as shown in FIG. 6, the pilot valve 46 has returned to the first height $H_1$ and the cam 106 is rotated, such that the first arc 114 engages the plunger 78. According to another exemplary embodiment, the third arc 118 may engage the plunger 78 and hold the pilot valve 46 at the third height $H_3$ until the outer chamber 22 is substantially evacuated.

Due to the release of water from the inner chamber 38 during the pressure release sequence, the outer chamber pressure $P_{OC}$ and the inner chamber pressure $P_{IC}$ are less than the threshold pressure $P_T$ (e.g., the original inner chamber pressure $P_{IC}$ at equilibrium). This configuration reduces the pressure differential between the outer chamber pressure $P_{OC}$ and ambient pressure $P_A$, which reduces the upward force on the flush valve 48 during the evacuation sequence such that the flush valve 48 is raised at a slower rate than in a pressure-assist toilet that does not include a pressure release sequence. The slower lift of the flush valve 48 reduces the likelihood of the flush valve 48 hitting the upper end 42 of the inner chamber 38 and bouncing back downward toward the chamber outlet 32 during the evacuation sequence, thereby reducing or eliminating mechanical noise from impacting the inner chamber 38. Further, the slower movement of the flush valve 48 during the evacuation sequence reduces the rapid change of direction of water between the outer chamber 22 and the inner chamber 38, thereby reducing water turbulence. As water flow becomes more laminar, operational noise decreases and energy efficiency increases.

Figure 7:
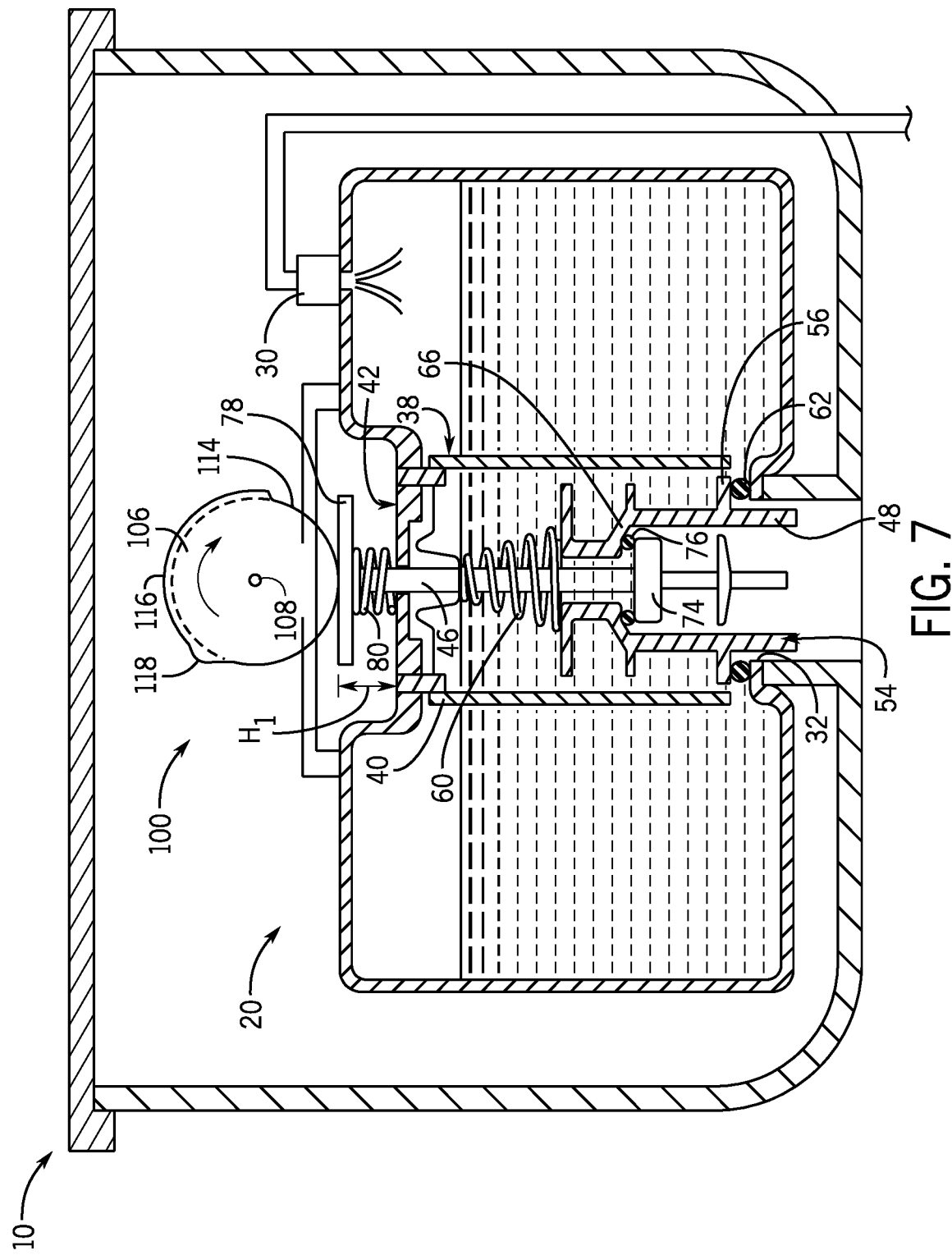
FIG. 7 shows the tank assembly of FIG. 1 in a fourth step of the flush sequence.

Referring now to FIG. 7, the tank assembly 10 is shown again in the filling sequence, with the flush valve 48 seated against the chamber outlet 32 and the pilot valve 46 seated against the flush valve 48. Further, the first arc 114 of the cam 106 engages the plunger 78. Water is introduced to the outer chamber 22 and around the wall 40 to the inner chamber 38 from the water supply line 28 at the tank inlet 18, until the outer chamber pressure $P_{OC}$ and/or the inner chamber pressure $P_{IC}$ reach the threshold pressure $P_T$ and the water level in the outer chamber 22 reaches the original level shown in FIGS. 1 and 3.

Figure 8:
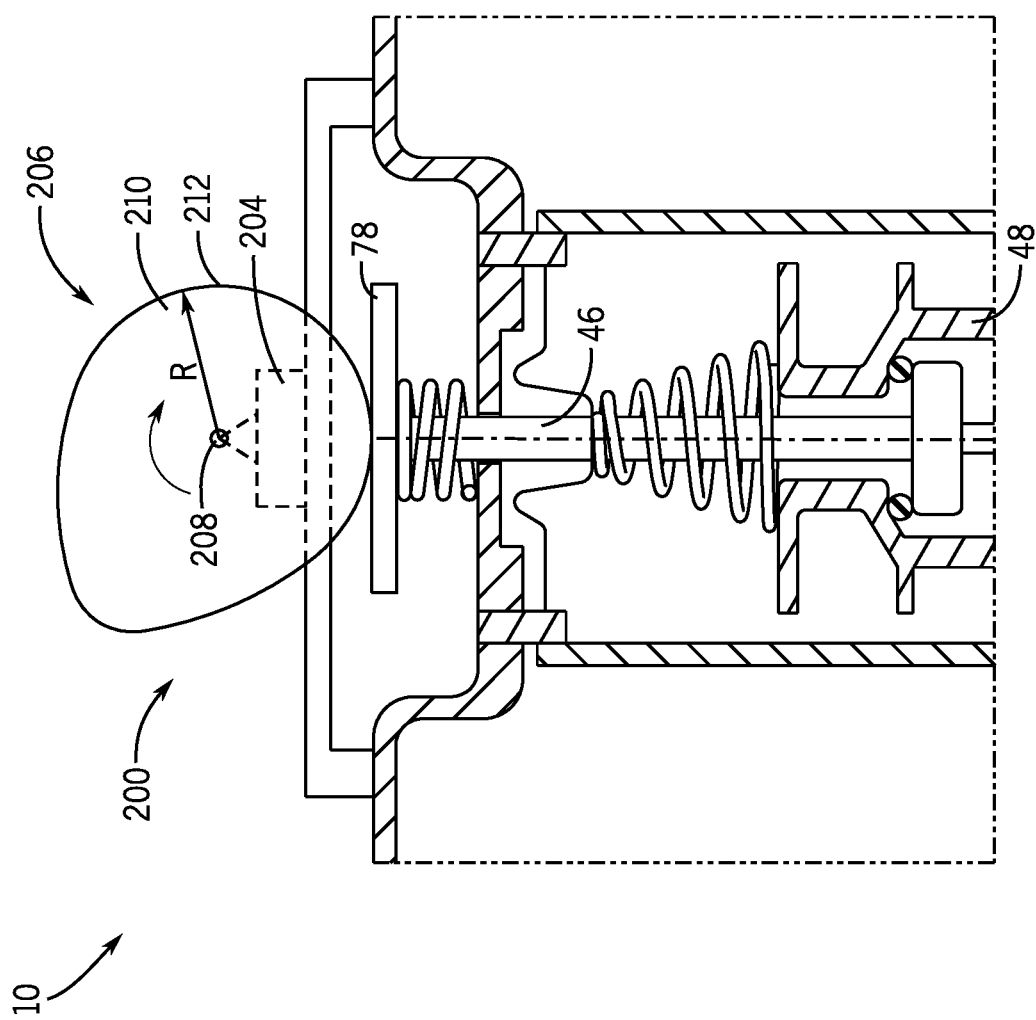
FIG. 8 is a cross-sectional view of a portion of a tank assembly with an actuator according to another exemplary embodiment.

Referring now to FIG. 8, an actuator 200 is shown installed on a tank assembly that is the same as or similar to the tank assembly 10 of FIG. 1, according to another exemplary embodiment. The actuator 200 may be substantially similar to the actuator 100, such that like reference numerals correspond to like features. For example, a cam 206 may be coupled to a motor 204 for rotation about a cam axis 208. However, it should be noted that while the cam 106 shown in FIG. 2B includes three distinct arcs 114, 116, 118, each having an approximately constant radius $R_1$, $R_2$, $R_3$, the cam 206 defines an asymmetric, oblong body 210. Various portions along an outer periphery 212 of the body 210 have different radii R, such that as the cam 206 rotates about the cam axis 208, the pilot valve 46 constantly changes height and is further depressed. When the radius R of the cam 206 is substantially the same as the first radius $R_1$, discussed above, the pilot valve is positioned at the first height $H_1$. When the radius R of the cam 206 is greater than the first radius and less than or the same as the second radius $R_2$, the pilot valve 46 is unseated but the flush valve 48 remains seated. When the radius R of the cam 206 is greater than the second radius $R_2$ (e.g., substantially the same as the third radius $R_3$, the flush valve 48 is unseated.

Figure 9:
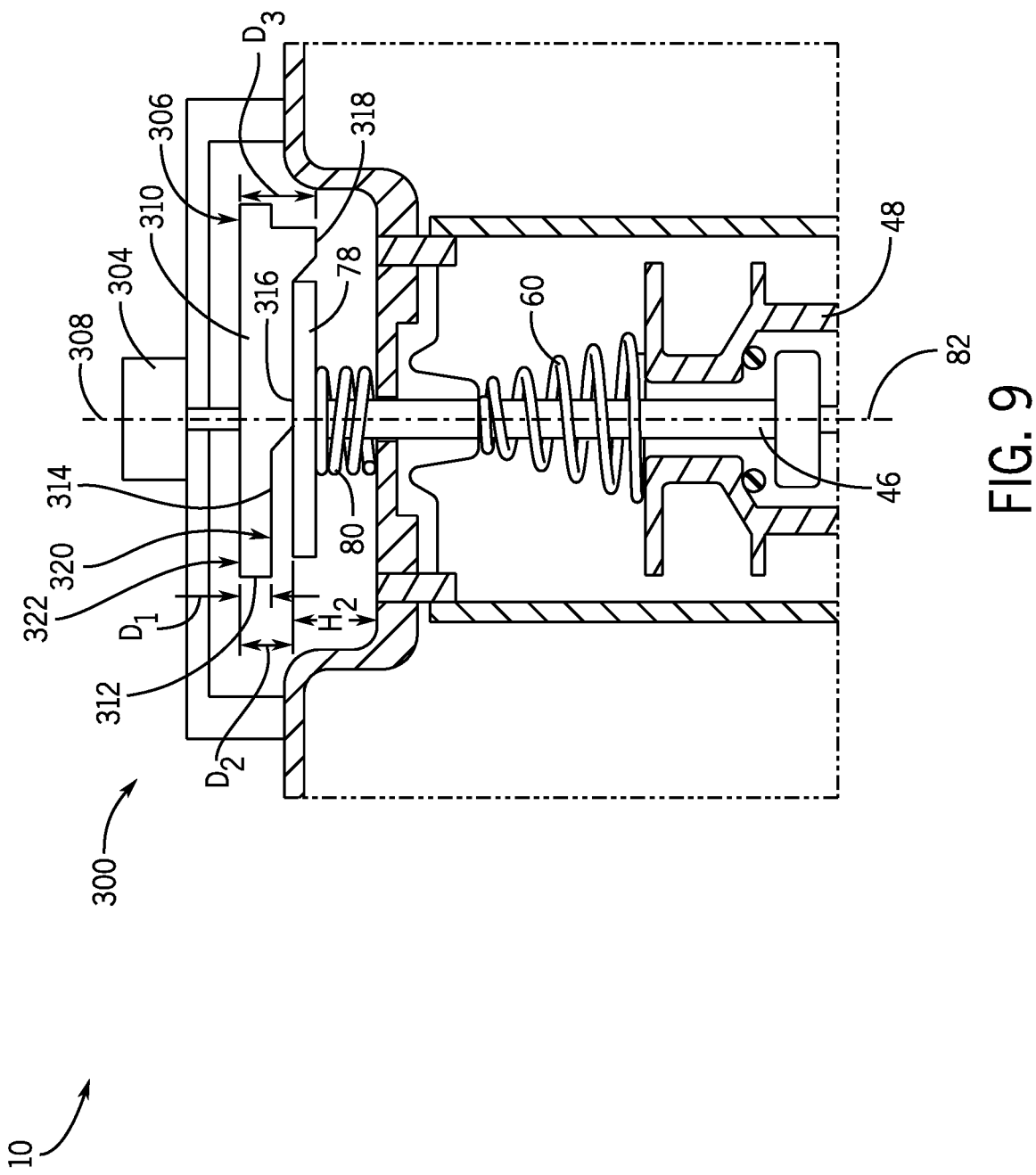
FIG. 9 is a cross-sectional view of a portion of a tank assembly with an actuator according to another exemplary embodiment.

Referring now to FIG. 9, an actuator 300 is shown installed on a tank assembly that is the same as or similar to the tank assembly 10 of FIG. 1, according to another exemplary embodiment. The actuator 300 may be substantially similar to the actuator 100, such that like reference numerals correspond to like features. For example, a cam 306 may be coupled to a motor 304 for rotation about a cam axis 308. However, it should be noted that while the cam 106 shown in FIG. 2B rotates about a cam axis 108 that is substantially perpendicular to the valve axis 82, the cam axis 308 as shown in FIG. 9 is substantially collinear with or parallel to the valve axis 82. The cam 306 includes a disc-shaped body 310 having a substantially constant radius or any other shape and defining an outer periphery 312. The body 310 has a lower surface 320, which is configured to engage the plunger 78 at various heights along a first arc 314, a second arc 316, and a third arc 318.

The lower surface 320 at each arc 314, 316, 318 defines an offset distance from an upper end 322 (e.g., upper surface) of the cam 306. For example, the first arc 314 includes a first offset distance $D_1$, configured to engage the pilot valve 46 at the first height $H_1$ (see also FIG. 3). The second arc 316 includes a second offset distance $D_2$ greater than the first offset distance $D_2$ and is configured to engage the pilot valve 46 at the second height $H_2$ (see also FIG. 4). Finally, the third arc 318 includes a third offset distance D3 greater than each of the first or second offset distances $D_1$, $D_2$, and is configured to engage the pilot valve 46 at the third height $H_3$ (see also FIG. 5). According to another exemplary embodiment, the offset distance of the cam 306 may vary at substantially all points about the cam 306 (e.g., similarly to the cam 206 in FIG. 8), such that the pilot valve 46 is constantly moving as the cam 306 rotates.

Figure 10:
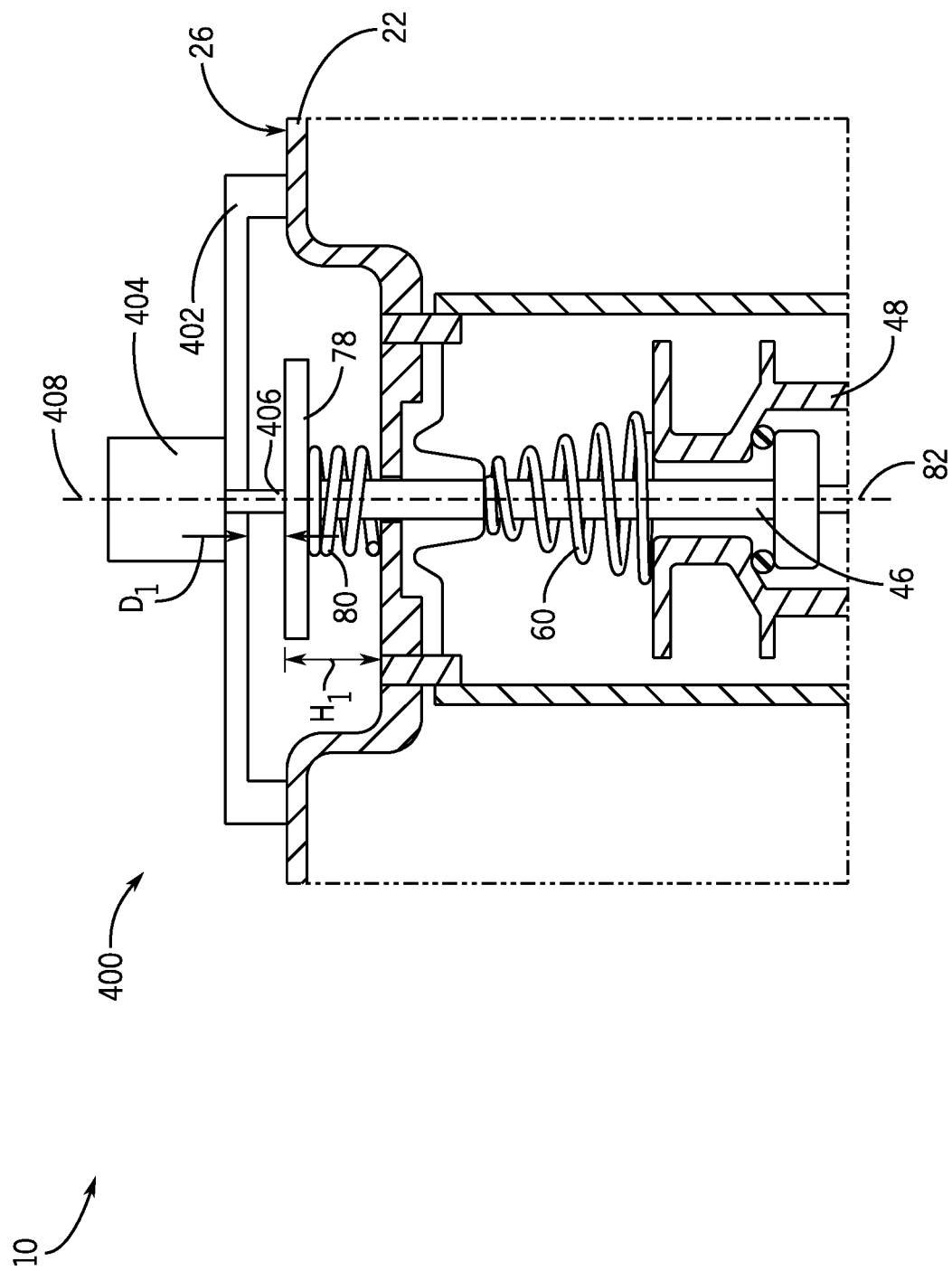
FIG. 10 is a cross-sectional view of a portion of a tank assembly with an actuator according to another exemplary embodiment.

Referring now to FIG. 10, an actuator 400 is shown installed on a tank assembly that is the same as or similar to the tank assembly 10 of FIG. 1, according to another exemplary embodiment. The actuator 400 includes a mounting plate 402 (i.e., mounting bracket) coupled to the upper end 26 of the outer chamber 22. The actuator 400 includes a motor 404, which may be a linear actuator (e.g., a linear solenoid) or other device configured to move the pilot valve 46 along the valve axis 82. For example, the actuator 400 includes an arm 406, which moves in line with (i.e., linearly along) an actuator axis 408, which is substantially collinear with or parallel to the valve axis 82. The arm 406 engages the plunger 78 and extends downward based on an input to the actuator 400. For example, the arm 406 extends a first offset distance $D_1$, configured to engage the pilot valve 46 at the first height $H_1$. The arm 406 may then extend a second offset distance $D_2$ (not shown) greater than the first offset distance $D_1$ and is configured to engage the pilot valve 46 at the second height $H_2$. Finally, the arm 406 may extend a third offset distance D3 (not shown) greater than each of the first or second offset distances $D_1$, $D_2$, and is configured to engage the pilot valve 46 at the third height $H_3$. According to another exemplary embodiment, the arm 406 may extend at other distances (e.g., similarly to the cam 206 in FIG. 8) during the flushing sequence, such that it is continuously moving at various points during the sequence.

According to various exemplary embodiments, the actuator 100, 200, 300, 400 may be directly actuated by a user pressing a lever, button, or other device, which sends a signal to a processor to begin a flush sequence by rotating the cam 106, 206, 306, or extending the arm 406. According to another exemplary embodiment, the tank assembly 10 includes a touchless actuation sensor, which sends the signal to the processor and begins the flush sequence. The flush sequence includes the pressure release sequence, the evacuation sequence, and the filling sequence as discussed above. Notably, rather than having a user press a lever, which directly engages the plunger 78, the user activates a three-stage flush sequence, which utilizes the actuator 100, 200, 300, 400 to dramatically reduce noise generated during the flush sequence for a pressure-assist toilet.

It should be further understood that the flush sequence may vary based on a speed that the cam 106, 206, 306 rotates or the speed that or timing of when the arm 406 extends. As the cam 106, 206, 306, or the arm 406 moves faster, the flush assembly 20 completes each of the pressure release, evacuation, and resetting sequences in closer succession, completing the entire flush sequence in a shorter duration. According to an exemplary embodiment, the flush sequence may vary based on a desired flush sequence. For example, the cam 106, 206, 306 may rotate or the arm 406 may extend at a higher speed for a first flush sequence and at a lower speed for a second different flush sequence. A user may then select between the first and second flush sequences depending on the type of waste (i.e., liquid-only or combined liquid and solid) present in the toilet. According to yet another exemplary embodiment, the cam 106, 206, 306 may complete less than a full revolution during the flush sequence, depending on the requirements for the motor 104, 204, 304, 404 and/or the power capacity for a power supply (e.g., a battery).

The design of the flush assembly 20 described with reference to FIG. 1 should not be considered limiting. Many alternatives are possible without departing from the inventive concepts disclosed herein. For example, in some embodiments, the toilet may include a pneumatically actuated (e.g., air actuated) flush assembly as opposed to a mechanically actuated flush assembly (e.g., the plunger-type mechanically actuated flush assembly 20 of FIG. 1). Pneumatically actuated flush assemblies rely on internal pressure provided through a fluid line in order to open a valve in the bottom of the pressure tank and initiate the flushing process (as compared to mechanically actuated pressure tanks which require that the valve or plunger be manually manipulated to initiate the flushing process).

Figure 11:
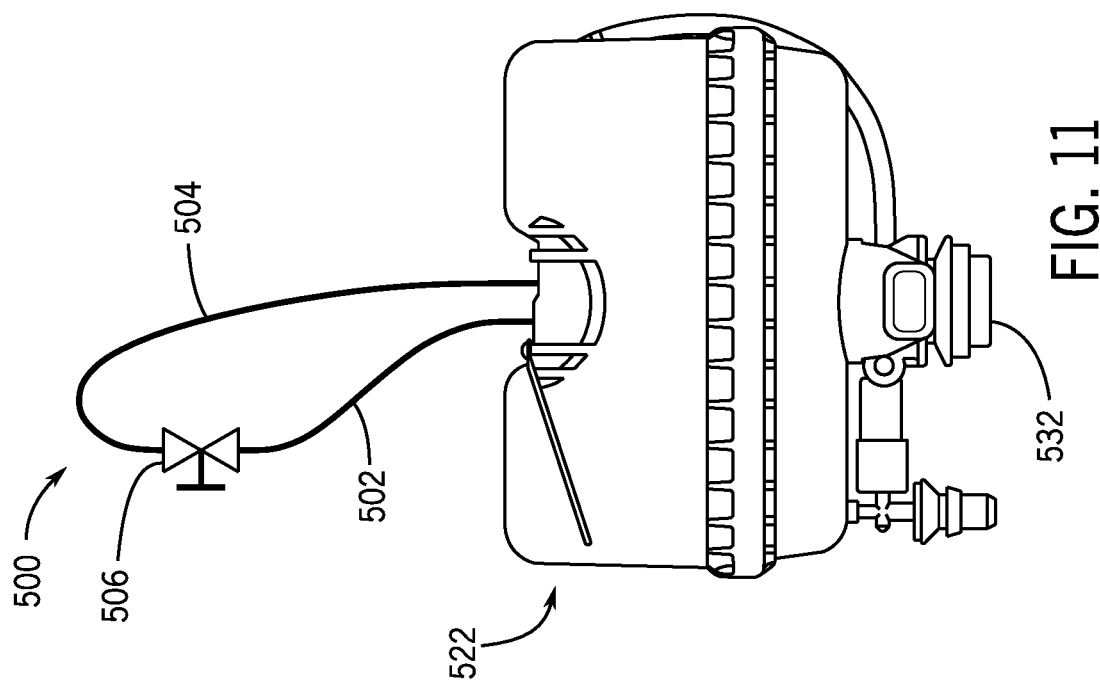
FIG. 11 is a front view of an air-actuated flush assembly, according to an exemplary embodiment.

Referring to FIG. 11, a pneumatically actuated flush assembly is shown as flush assembly 500, according to an exemplary embodiment. The flush assembly 500 may be installed in a tank (as described with reference to the flush assembly 20 and tank 12 of FIG. 1), or installed on a toilet without a tank such as in a wall or other location (e.g., toilet pedestal). As with the flush assembly 20 of FIG. 1, the flush assembly 500 of FIG. 11 is fluidly coupled to a toilet bowl of the toilet and configured to dispense water into the toilet bowl during a flush cycle. As shown in FIG. 11, the flush assembly 500 includes a pressurized outer chamber 522 (i.e., a first chamber, vessel, tank, compartment, housing, container, etc.), which is sealed and receives water from a water source. The flush assembly 500 also includes a pair of flow lines (e.g., conduit, tubes, etc.), shown as first line 502, and second line 504. The first line 502 may be a high pressure line containing fluid such as air, water, or a combination thereof. The second line 504 may be a low pressure line containing a fluid at reduced pressure relative to the fluid in the first line 502. The second line 504 may be fluidly coupled to a flush valve cartridge (not shown) that is coupled to and disposed substantially within the outer chamber 522. The flush valve cartridge may be configured to actuate a flush valve and/or pilot valve disposed in a base (e.g., lower wall) of the outer chamber 522 to allow water to be delivered from the outer chamber 522 into the toilet bowl (e.g., through a chamber outlet 532 of the outer chamber 522). The flush valve cartridge may be configured to actuate the flush valve in response to an applied fluid pressure within the second line 504, a flow rate of fluid through the second line 504, or a combination thereof. According to various exemplary embodiments, the position of the flush valve may be determined based on the fluid pressure within the second line 504. As such, the degree of openness of the flush valve (e.g., the flow area between the flush valve and the chamber outlet, the position of the flush valve relative to the chamber outlet) may be a function of the fluid pressure within the second line 504.

As shown in FIG. 11, the flush assembly 500 additionally includes a valve 506 that fluidly couples (e.g., connects, etc.) the first line 502 to the second line 504. The valve 506 may be an electronic solenoid valve configured to selectively fluidly couple the first line 502 to the second line 504 in response to a control signal (e.g., a voltage, etc.) from a controller. As such, the valve 506 may be actuated at least partially remotely. In some embodiments, the valve 506 is coupled to a touchless sensor (e.g., a motion sensor such as an infrared sensor, an optical sensor, etc.) that provides touchless activation of a flush cycle based on a user's presence (e.g., a user positioned in front of or in proximity to the toilet, etc.).

In some embodiments, the valve 506 is a proportional flow control valve (e.g., a proportional solenoid valve, a manually actuated proportional flow control valve, etc.) used to vary the size of the flow passage between the first line 502 and the second line 504 (e.g., via a restrictor, etc.) and thereby vary the flow rate through the proportional flow control valve during a flush cycle. Again, the valve 506 may be communicably coupled to a controller and configured to receive control signals from the controller throughout the flush cycle. In other embodiments, the valve 506 is coupled to a servo or stepper motor configured to vary a position of a restrictor within the valve 506 in response to control signals from the controller. In either case, the controller is configured to vary the pressure drop across the valve and thus the flow rate through the valve 506 as a function of time during the flush cycle. For example, the controller may be configured to actuate the proportional control valve to a plurality of predetermined positions, with each position corresponding to a different part of a flush sequence (e.g., a filling or resetting sequence, a pressure release sequence, and an evacuation sequence, etc.).

By way of example, during the filling sequence, the controller may be configured to hold the valve in the closed position, preventing flow from draining through the chamber outlet 532 and allowing time for the outer chamber 522 to fill with water. During the pressure relieving sequence, the controller may be configured to open the valve 506 by only a small amount (e.g., 2°, 4°, etc.) at the beginning of a flush cycle to allow flow to pass, in controlled quantity, from the first line 502 to the second line 504. In response to actuation of the valve 506, the flush valve may be opened to allow a portion of the water contained within the outer chamber 522 to be delivered into the toilet bowl without triggering a siphon. Finally, during the evacuation sequence, the controller may be configured to fully open the valve 506 and the flush valve to deliver the remaining quantity of water from the outer chamber 522 into the toilet bowl, triggering a siphon in the toilet.

Figure 12:
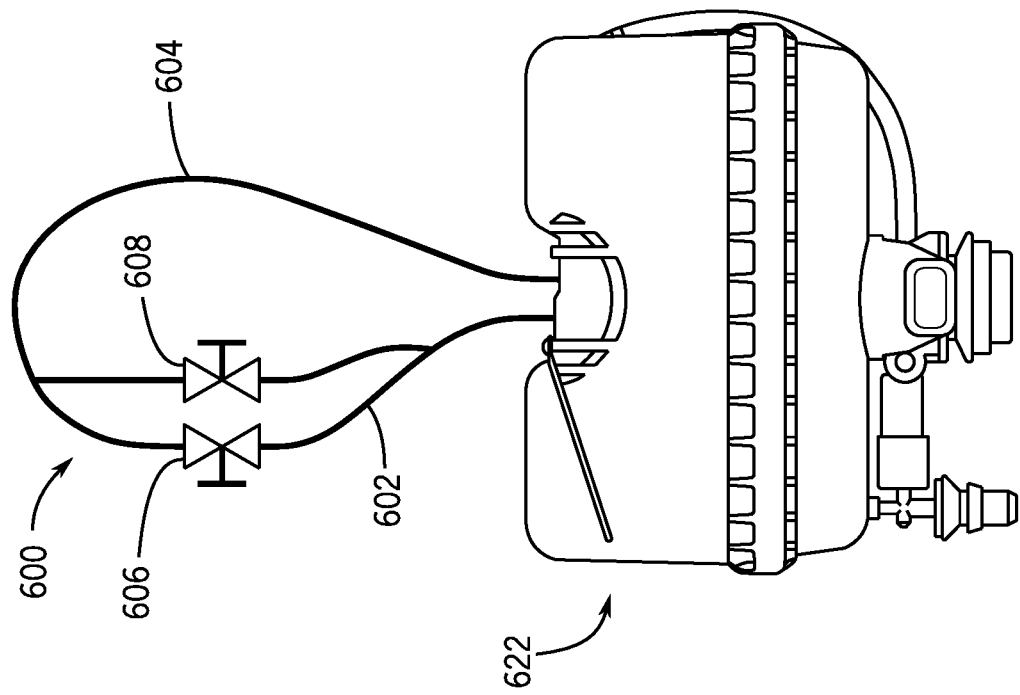
FIG. 12 is a front view of an air-actuated flush assembly, according to another exemplary embodiment.

Referring to FIG. 12, a flush assembly 600 is shown to include a plurality of valves between the first line 602 and the second line 604, according to an exemplary embodiment. As shown in FIG. 12, the plurality of valves includes a first stage valve 606 and a second stage valve 608 in parallel with the first stage valve 606. The first stage valve 606 has a higher restriction than the second stage valve 608. In other words, the first stage valve 606 is a low flow rate valve which limits the flow rate of fluid between the first line 602 and the second line 604 to a lower value than can be achieved using the second stage valve 608. In operation, the first stage valve 606 and the second stage valve 608 can be used to selectively vary the flow rate of water from the outer chamber 622 into the toilet bowl. For example, during the pressure release sequence, a controller may activate the first stage valve 606 independently from the second stage valve 608. During the evacuation sequence, the controller may activate the second stage valve 608 alone, or in cooperation with the first stage valve 606 to fully open the passage between the first line 602 and the second line 604. After the water has been emptied from the outer chamber 622, the controller may deactivate (e.g., close) both the first stage valve 606 and the second stage valve 608 to allow the outer chamber 622 to refill with water in preparation for the next flush cycle.

Figure 13:
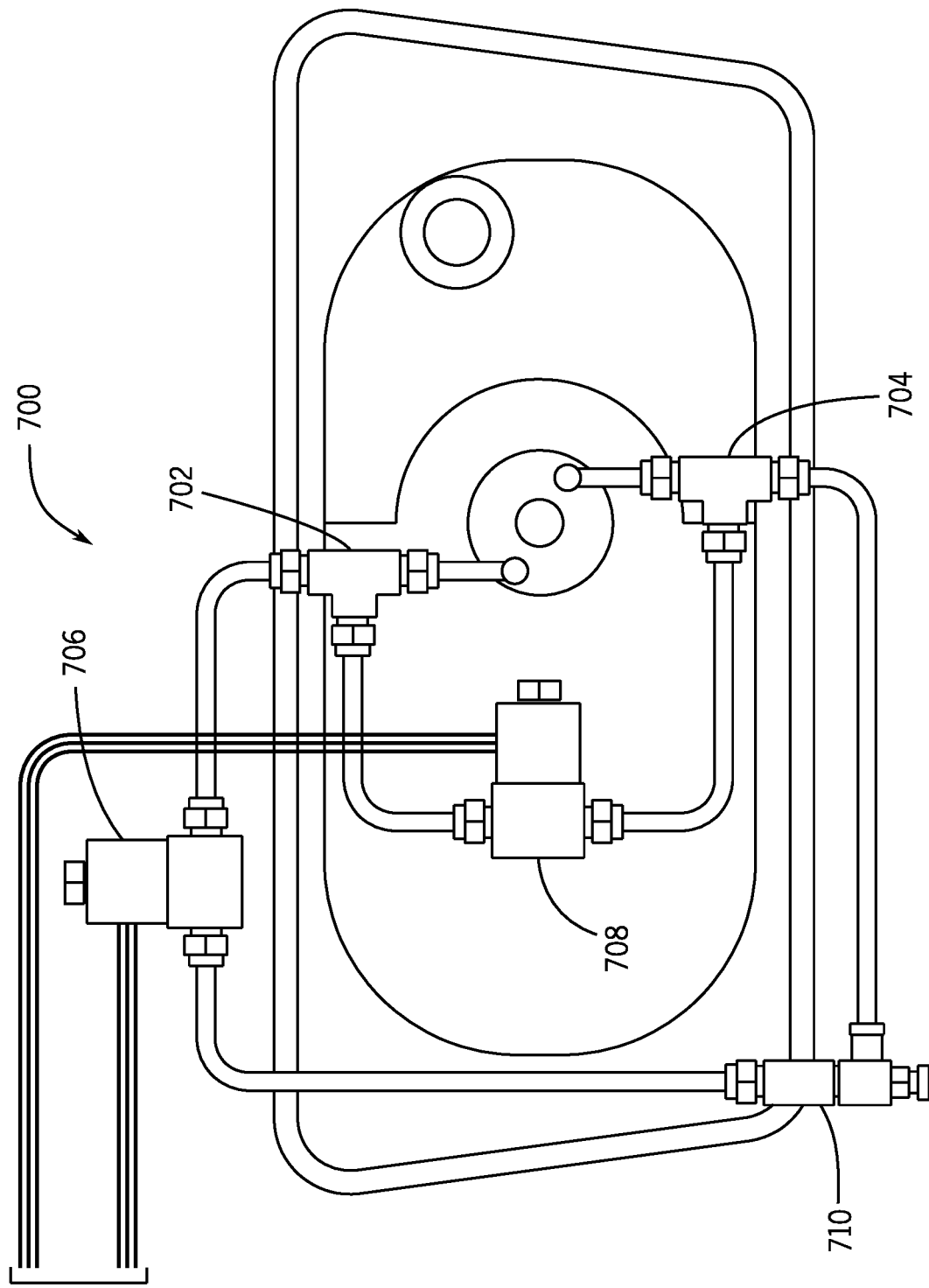
FIG. 13 is a top view of a toilet including an air-actuated flush assembly, according to an exemplary embodiment.

In other exemplary embodiments, both the first stage valve 606 and the second stage valve 608 may have substantially the same flow restriction (e.g., the flow coefficient of the first stage valve 606 and the second stage valve 608 may be approximately the same). For example, FIG. 13 shows a flush assembly 700 that includes a plurality of solenoid valves having approximately the same flow restriction. The flush assembly 700 additionally includes a throttle valve 710 arranged in series with only one of the solenoid valves such that the amount of flow passing through each leg of the flow circuit depends on which solenoid valve is activated. In yet other embodiments, additional valves may be included in the flow circuit between the first line 702 and the second line 704 to further tailor the operation of the flow circuit during the flush cycle.

Figure 14:
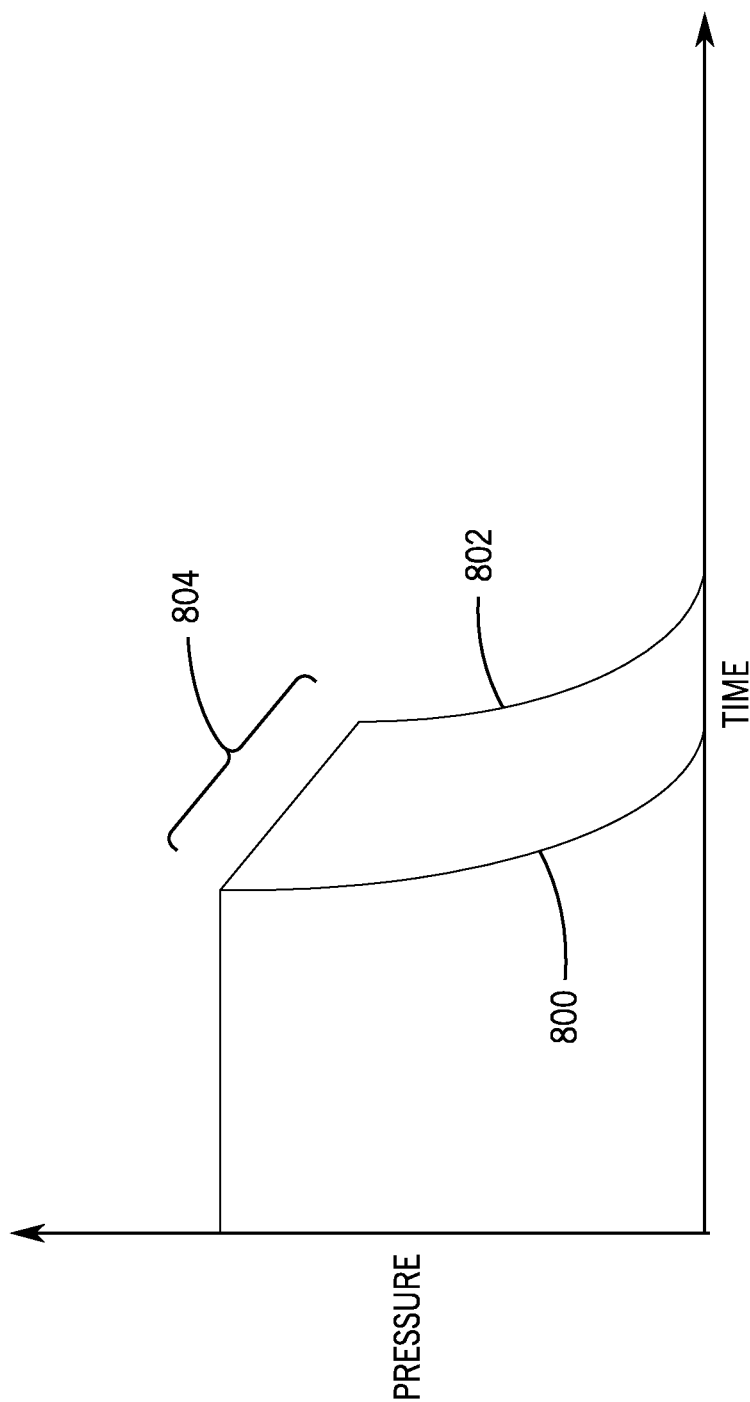
FIG. 14 is a plot of pressure as a function of time during a flush cycle, according to an exemplary embodiment.

Referring to FIG. 14, the operation of the flush assemblies 500, 600, 700 of FIGS. 11-13 are shown, according to an exemplary embodiment. Line 800 illustrates the release of pressure from a pressure-assist toilet assembly without a quiet flush actuator. Line 802 illustrates the release of pressure from a pressure-assist toilet that includes a quiet flush actuator. In contrast to a conventional flush cycle, the flush cycle for a toilet with a quiet flush actuator (e.g., the proportional valve 506 described with reference to FIG. 11, or the plurality of flow control valves described with reference to FIGS. 12-13) includes a pressure release sequence 804 that reduces the amount of noise (e.g., flow noise, flush valve actuation noise, etc.) produced during the flush cycle. The shape of the pressure curve shown in FIG. 14 will vary depending on the physical properties of the flow control valve(s), and the control parameters used to selectively actuate the valve(s).

Figure 15:
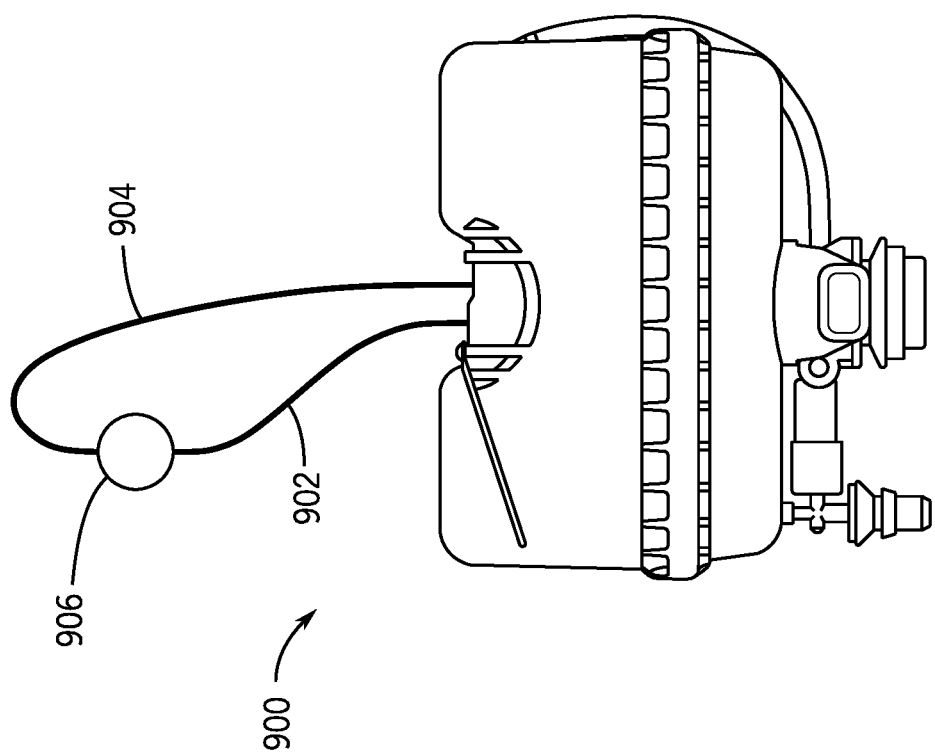
FIG. 15 is a front view of an air-actuated flush assembly, according to another exemplary embodiment.

It will be appreciated that a variety of different control devices may be used in place of the valves 506, 606, 608, 706, 708 of FIGS. 11-13. Referring to FIG. 15, a flush assembly 900 is shown to include an electronic variable speed pump 906 between a first line 902 of the flush assembly 900 and a second line 904 of the flush assembly 900, according to an exemplary embodiment. The pump 906 is configured to selectively vary the amount of flow between the first line 902 and the second line 904 during a flush cycle. According to an exemplary embodiment, the pump 906 is a peristaltic pump. In other embodiments, another type of pump may be used. In various exemplary embodiments, the pump 906 is communicably coupled to a controller that is configured to selectively vary a rotational speed of the pump throughout the flush cycle.

Referring to FIG. 16, a flush assembly 1000 is shown to include a mechanical flow control valve 1006 in place of an electronic solenoid valve, according to an exemplary embodiment. As with other embodiments disclosed herein, the mechanical flow control valve 1006 fluidly connects a first line 1002 of the flush assembly 1000 with a second line 1004 of the flush assembly 1000, and is configured to provide a pressure release sequence during a flush cycle. More specifically, the mechanical flow control valve 1006 is configured to automatically switch between a pressure release sequence and an evacuation sequence during a flush cycle. In other words, after triggering the mechanical flow control valve 1006, the transition between the pressure release sequence and the evacuation sequence occurs without user input. The operating principle of the mechanical flow control valve 1006 is shown conceptually in FIGS. 17-18. According to an exemplary embodiment, the mechanical flow control valve 1006 is an irrigation valve configured to open in multiple stages. As shown in FIG. 17, the mechanical flow control valve 1006 includes a valve body 1008 defining a primary opening 1010 and a channel 1012 downstream of the primary opening 1010. The mechanical flow control valve 1006 additionally includes a diaphragm 1014 disposed substantially within the primary opening 1010 and preventing flow therethrough. FIG. 17 shows the mechanical flow control valve 1006 in a closed position in which the diaphragm 1014 is biased toward the primary opening 1010 by a spring 1016, and also by fluid pressure applied to the diaphragm 1014 along an upper surface of the diaphragm 1014. As shown in FIG. 17, the mechanical flow control valve 1006 further includes a second valve 1018 (e.g., a manual control valve, an electronic solenoid valve, etc.) that fluidly couples the channel 1012 with a region of fluid above the diaphragm 1014. Upon activation of the second valve 1018, fluid is released from the region, through the channel 1012, and into an outlet of the valve body 1008. This release of fluid pressure, above the diaphragm 1014, occurs slowly due to the pressure drop across the channel 1012. Eventually, the release of pressure above the diaphragm 1014 causes the diaphragm 1014 to retract away from the primary opening 1010, which allows flow to pass through the primary opening 1010, from the first line 1002 at the inlet to the valve body 1008 to the second line 1004 at the outlet (see FIG. 18).

Figure 19:
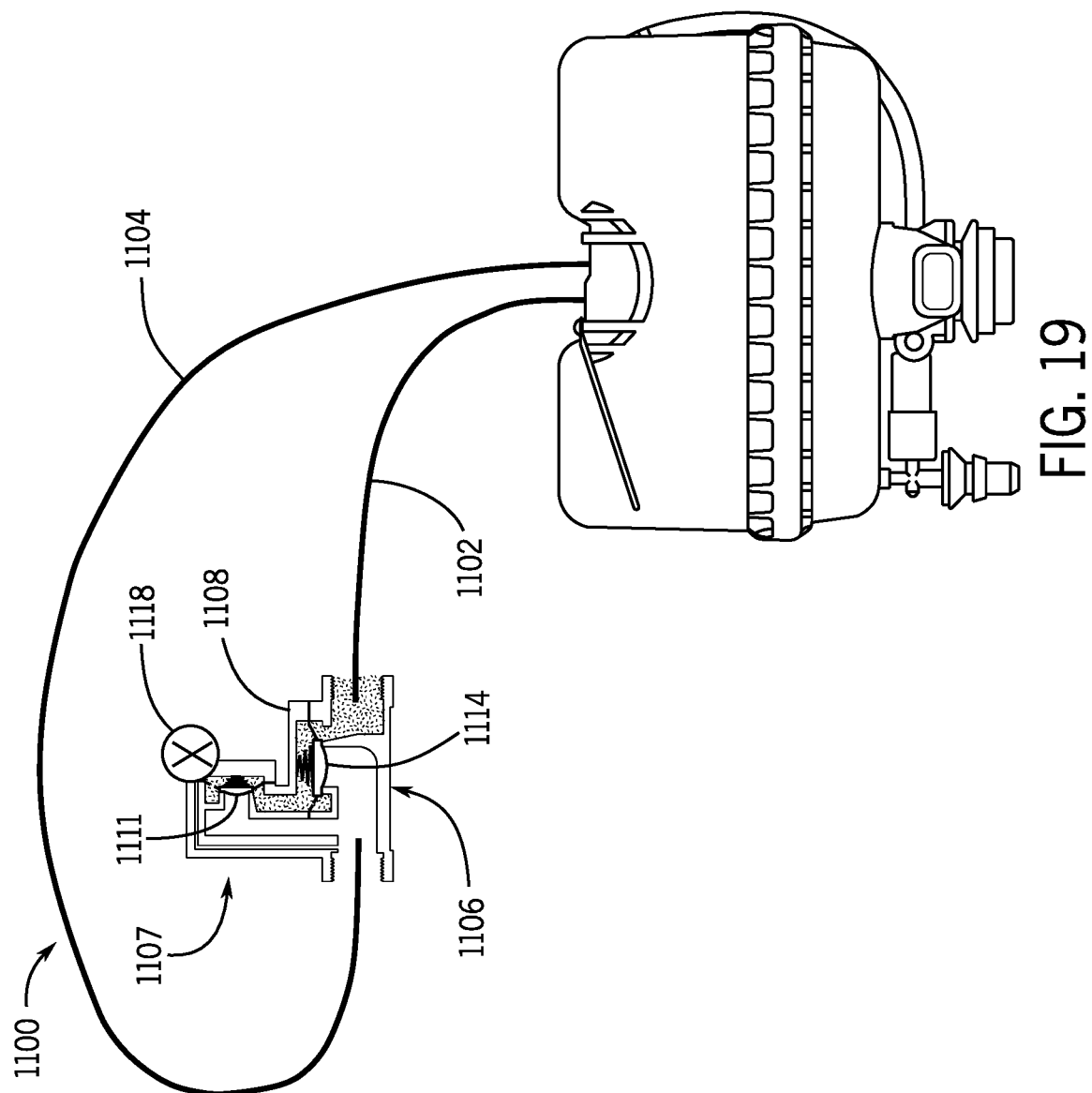
FIG. 19 is a front view of an air-actuated flush assembly, according to another exemplary embodiment.

Referring to FIG. 19, a flush assembly 1100 is shown to include a plurality of mechanical flow control valves, according to an exemplary embodiment. The flush assembly 1100 may be the same as or similar to the flush assembly 1000 of FIG. 18. In the flush assembly 1100 of FIG. 19, a second mechanical flow control valve 1107 is used in place of a channel of a first mechanical flow control valve 1106. More specifically, the second mechanical flow control valve 1107 fluidly couples a region above a diaphragm 1114 of the first mechanical flow control valve 1106 with an outlet to the first mechanical flow control valve 1107. The second mechanical flow control valve 1107 is configured (e.g., sized, dimensioned, etc.) to open without a substantial delay in comparison to the first mechanical flow control valve 1106 (e.g., without as substantial a reduction in pressure above the diaphragm as compared to the first mechanical flow control valve 1107). In other words, the diaphragm 1111 of the second mechanical flow control valve 1107 is configured to retract from the primary opening approximately immediately upon activation of a third valve 1118 (e.g., a user control valve, solenoid valve, etc.) of the flush assembly 1100. The diaphragm 1111 of the second mechanical flow control valve 1107 is smaller than the diaphragm 1114 of the first mechanical flow control valve 1106. The springs used in each of the first mechanical flow control valve 1106 and the second mechanical flow control valve 1107 may also be different (e.g., the spring used in the second mechanical flow control valve 1107 may apply a smaller force to the diaphragm than the spring used in the first mechanical flow control valve 1106, etc.). Among other benefits, the arrangement of flow control valves used in the flush assembly 1100 of FIG. 19 allows the flush cycle to be activated with only a momentary activation of the third valve 1118, as compared to the flush assembly 1000 of FIG. 18, in which the second valve 1018 must be held down through the pressure release sequence, until the fluid pressure is sufficiently reduced in the region above the diaphragm 1014.

Figure 21:
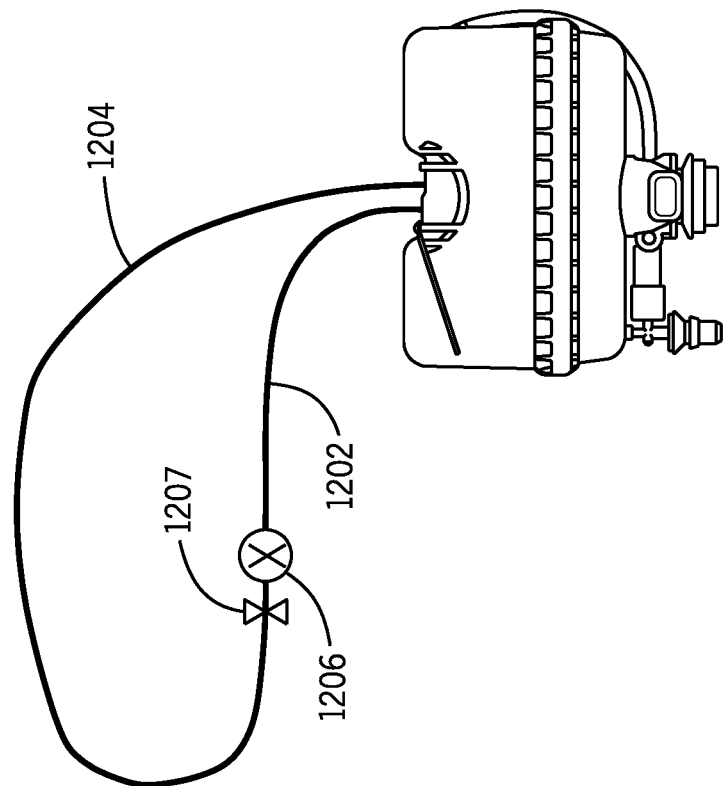
FIG. 21 is a front view of an air-actuated flush assembly, according to another exemplary embodiment.
Figure 20:
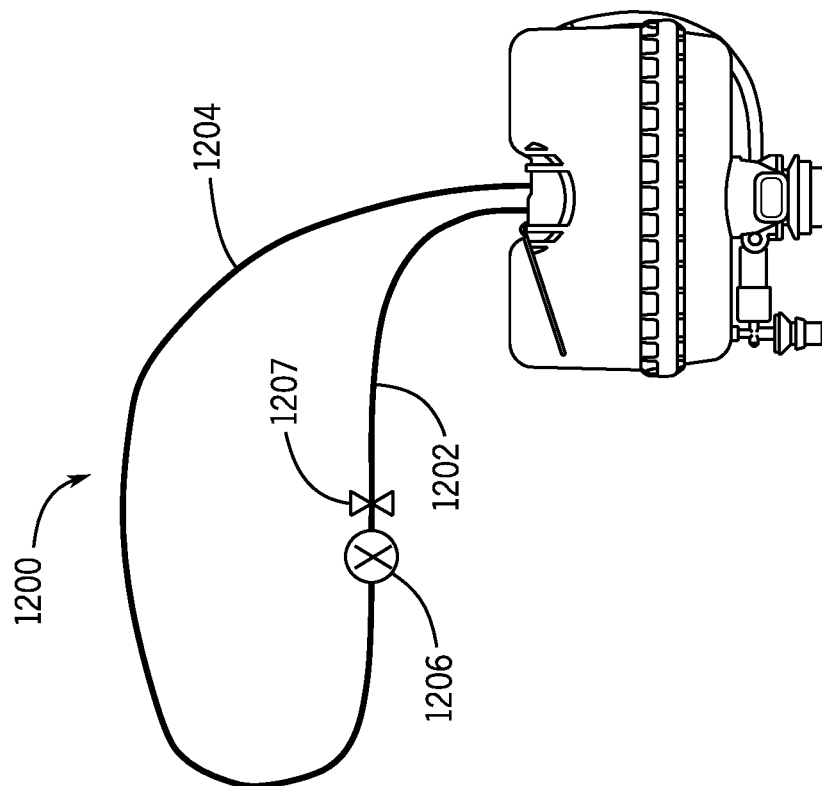
FIG. 20 is a front view of an air-actuated flush assembly, according to another exemplary embodiment.

In some embodiments, the flush assembly may be tuned to provide quiet-flushing with a single two-way valve. Referring to FIG. 20, a flush assembly 1200 is shown to include a two-way valve 1206 and an orifice 1207 disposed upstream from the two-way valve 1206, in series flow arrangement with the two-way valve 1206, according to an exemplary embodiment. In other embodiments (FIG. 21), the orifice 1207 may be disposed downstream of the two-way valve 1206. In the embodiment of FIG. 20, the flush valve cartridge (not shown) is designed to open in response to a reduction in fluid pressure in the second line 1204 below a threshold fluid pressure, rather than a pressure that is approximately equal to the fluid pressure in the first line 1202.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, dimensions, structures, shapes and proportions of the various elements, values of parameters, mounting arrangements, orientations, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A flush assembly for a pressure assist toilet, the flush assembly comprising:
   a flush valve configured to control a flow of water;
   a first line;
   a second line coupled to the flush valve; and
   a quiet flush actuator fluidly coupled to the first line and the second line, the flush assembly configured to selectively control a passage between the first line and the second line,
   wherein the passage between the first line and the second line is a first flow rate at a beginning of a flush cycle and a second flow rate that is greater than the first flow rate, and
   wherein the flush valve is configured to actuate in response to an applied fluid pressure, a flow rate, or a combination of an applied pressure and a flow rate in the second line.

2. The flush assembly of claim 1, wherein a degree of openness of the flush valve is a function of the fluid pressure within the second line.

3. The flush assembly of claim 1, wherein the flow of water flows into a bowl of the toilet, wherein at the first flow rate a siphon is not formed in the toilet, and
   wherein at the second flow rate a siphon is formed in the toilet.

4. The flush assembly of claim 1, further comprising a controller communicably coupled to the quiet flush actuator, wherein at the first flow rate the controller is configured to open the quiet flush actuator a first amount and at the second flow rate the controller is configured to open the quiet flush actuator a second amount.

5. The flush assembly of claim 1, wherein the quiet flush actuator is a proportional flow control valve.

6. The flush assembly of claim 1, wherein the quiet flush actuator is a mechanical flow control valve configured to automatically switch between a pressure release sequence and an evacuation sequence during the flush cycle.

7. The flush assembly of claim 1, wherein the quiet flush actuator comprises a variable speed pump.

8. The flush assembly of claim 1, further comprising:
   an orifice disposed in one of the first line and the second line proximate to the quiet flush actuator.

9. A flush assembly for a pressure assist toilet, the flush assembly comprising:
   a chamber;
   a flush valve coupled to the chamber and configured to control a flow of water from the chamber;
   a first line;
   a second line coupled to the flush valve;
   a first stage valve fluidly coupled to both the first line and the second line; and
   a second stage valve fluidly coupled to both the first line and the second line and in a parallel flow arrangement with the first stage valve, the flush assembly configured to selectively control a passage between the first line and the second line from a first flow rate at a beginning of a flush cycle to a second flow rate that is greater than the first flow rate,
   wherein the flush valve is configured to actuate in response to an applied fluid pressure, a flow rate, or a combination of an applied fluid pressure and a flow rate in the second line.

10. The flush assembly of claim 9, wherein the first stage valve has a higher restriction than the second stage valve.

11. The flush assembly of claim 9, further comprising:
    a throttle valve arranged in series with one of the first stage valve and the second stage valve.

12. The flush assembly of claim 11, wherein the first stage valve and the second stage valve have substantially the same flow restriction.

13. The flush assembly of claim 9, further comprising:
    a controller communicably coupled to the first stage valve and the second stage valve, wherein at the first flow rate the controller is configured to activate the first stage valve independently from the second stage valve, and wherein at the second flow rate the controller is configured to activate the second stage valve.

* * * * *